United States Patent [19]

Mase et al.

[11] Patent Number: 5,761,520
[45] Date of Patent: Jun. 2, 1998

[54] DATA PROCESSING METHOD

[75] Inventors: Atsushi Mase; Masayuki Taniguchi; Masahiro Hirata; Teruyuki Harada; Minako Shimada, all of Aichi, Japan

[73] Assignee: Mitsubishi Denki Kabushiki Kaisha, Tokyo, Japan

[21] Appl. No.: 568,374

[22] Filed: Dec. 6, 1995

[30] Foreign Application Priority Data

Dec. 6, 1994 [JP] Japan ................. 6-302185
Apr. 24, 1995 [JP] Japan ................. 7-098641

[51] Int. Cl.⁶ ........................................ G06F 13/00
[52] U.S. Cl. ........................... 395/800.01; 364/136
[58] Field of Search .................. 395/800.07, 800.28, 395/800.32, 200.31, 200.38, 200.43, 825, 853; 364/130–134, 136, 138, 147, 480, 550

[56] References Cited

U.S. PATENT DOCUMENTS

| | | | |
|---|---|---|---|
| 4,227,245 | 10/1980 | Edblad et al. | 364/468.01 |
| 4,514,822 | 4/1985 | Schneider et al. | 364/498 |
| 4,747,060 | 5/1988 | Sears, III et al. | 364/481 |
| 4,974,181 | 11/1990 | Sinderson et al. | 364/550 |
| 5,150,313 | 9/1992 | van den Engh et al. | 364/569 |
| 5,295,063 | 3/1994 | England | 364/188 |
| 5,325,522 | 6/1994 | Vaughn | 395/601 |
| 5,394,237 | 2/1995 | Chang et al. | 356/328 |
| 5,638,299 | 6/1997 | Miller | 364/550 |

FOREIGN PATENT DOCUMENTS

A-4204383  8/1993  Germany.
215124    10/1993  Taiwan.

*Primary Examiner*—Alpesh M. Shah
*Attorney, Agent, or Firm*—Sughrue, Mion, Zinn, Macpeak & Seas, PLLC

[57] ABSTRACT

A data processing method which makes it unnecessary to run a user application program describing detailed conditions under which data on a device having a memory are acquired each time a system is started. A main controller forms a text format file as a data acquisition condition for a PLC from which data is to be acquired so that the data acquisition condition is associated with a label name, the data acquisition condition including a supervisory interval for supervising the status of the PLC and the operation status of the PLC for setting a trigger condition for starting data acquisition. When receiving the label name and the corresponding data acquisition condition from the main controller, a subcontroller develops and stores is the received data acquisition condition in a memory so that the data acquisition condition is associated with the label name. When receiving only the label name from the main controller, the subcontroller compares the data acquisition condition that is developed and stored in the memory with data of the PLC, acquires data from the PLC when the data acquisition condition is satisfied, and transfers the acquired data to the main controller.

8 Claims, 20 Drawing Sheets

```
TOSOSAGYOU(100, 0, 3,
           1, D, 1, =, 2, 2, W, 0, <, 5, 3, D, 10, >=, 2,
           USTART, 1and2, or3, UEND,
           1, W, 100, 2, 2, D, 30, 4)
```
~43

FIG. 9

LABEL NAME : TOSOUSAGYOU

| Address | Value | Description |
|---|---|---|
| 0 | 100 | TRIGGER SUPERVISORY INTERVAL |
| 2 | 0 | INTERVAL |
| 4 | 3 | NUMBER OF TRIGGERS |
| 6 | 1 | STATION NO. |
| 8 | D | DEVICE TYPE |
| A | 1 | DEVICE NO. |
| C | = | DEVICE NUMBER |
| E | 2 | |
| 10 | 2 | STATION NO. |
| 12 | W | DEVICE TYPE |
| 14 | 0 | DEVICE NO. |
| 16 | < | DEVICE STATUS |
| 18 | 5 | |
| 1A | 3 | STATION NO. |
| 1C | D | DEVICE TYPE |
| 1E | 10 | DEVICE NO. |
| 20 | >= | DEVICE STATUS |
| 22 | 2 | |
| 24 | 2 | NUMBER OF COMBINATIONS |
| 26 | 1 AND 2 | COMBINATIONS |
| 28 | OR 3 | |
| 2A | 2 | NUMBER OF ACCESS DATA |
| 2C | 1 | STATION NO. |
| 2E | W | DEVICE TYPE |
| 30 | 100 | HEAD DEVICE NO. |
| 32 | 2 | SIZE |
| 34 | 2 | STATION NO. |
| 36 | D | DEVICE TYPE |
| 38 | 30 | HEAD DEVICE NO. |
| 3A | 4 | SIZE |

44

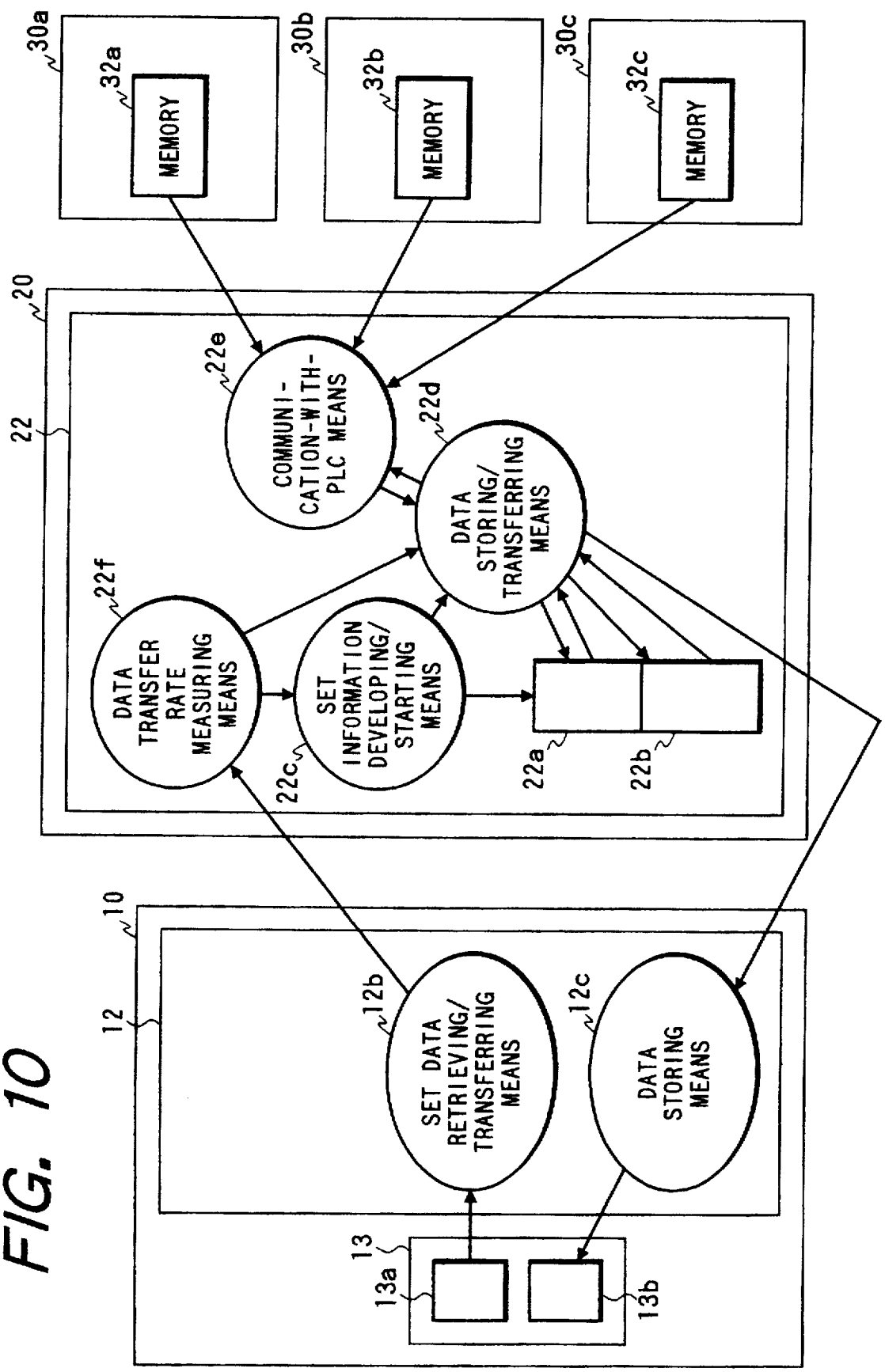

FIG. 18

PRIORITY INFORMATION TABLE

| LABEL LINE | REQUEST SOURCE MAIN CONTROLLER | AMOUNT OF ACQUIRED DATA |
|---|---|---|
| TOSOSAGYOU | A | 500 |
| HANSOU | B | 1000 |
| KONPOU | C | 20 |
| ⋮ | ⋮ | ⋮ |

FIG. 19

REQUEST SOURCE TABLE

| REQUEST SOURCE MAIN CONTROLLER |
|---|
| A |
| B |
| C |
| ⋮ |

DATA PROCESSING METHOD

BACKGROUND OF THE INVENTION

The present invention relates to a data processing method for acquiring, via a communication line, and processing data retained by a plurality of control apparatuses, such as programmable logic controllers (hereinafter called "PLCs"), having a storage unit.

FIGS. 22 and 23 show a conventional processing apparatus by way of example. FIG. 22 is a block diagram illustrating the constitution of such a conventional data processing apparatus, and FIG. 23 is a flowchart showing a conventional data processing method. In these drawings, reference numeral 1 denotes a main controller for controlling a PLC 4 and input-output units such as a CRT 2 and a keyboard 3; 2, a CRT; 3, a keyboard; 4, a PLC; 5, a CPU for executing user programs; 6, a memory for storing the data acquired from the PLC 4 via a communication line and developing user application programs; 7, an auxiliary storage unit for retaining the user application programs; 8a, an interface with the CRT 2; 8b, an interface with the keyboard 3; and 8c, an interface with the PLC 4.

Referring to the flowchart of FIG. 23, the operation of the conventional data processing apparatus will subsequently be described. When the main controller 1 is started at STEP S1001, the user application program developed in the memory 6 is started. The user application program is executed, at STEP S1002, to acquire data for judging whether a trigger condition for data acquisition from the PLC 4 is met, that is, whether the contents of data in the PLC 4 satisfy a condition for data acquisition. It is checked at STEP 1003 whether the trigger condition is met. If the trigger condition is not met, the flow returns to STEP S1002 in order to acquire data for judging whether the trigger condition is met. If the trigger condition is met, the intended data is acquired from the PLC 4 at STEP S1004. Whether a sufficient storage area is left in the memory 6 is checked at STEP S1005. If there remains a sufficient storage area, the acquired data is stored in the memory 6 at STEP S1006 and the flow returns to STEP S1004. If a sufficient storage area is not left in the memory 6, is whether a sufficient storage area is left in the auxiliary storage unit is checked at STEP S1007. If there remains a sufficient storage area, the data stored in the memory 6 is transferred to the auxiliary storage unit 7 and the flow returns to STEP S1005. If, however, a sufficient storage area is not left in the auxiliary memory 7, the flow bypasses STEPs S1008 and S1009 and goes to STEP S1010 to terminate the operation of acquiring the data. At STEP S1009, it is checked whether a signal for terminating data acquisition has been applied from the keyboard 3. If the signal has been applied, the data acquisition is terminated at STEP S1010. If the signal for terminating the data acquisition has not been applied yet, the flow returns to STEP S1002 and the process is repeated from the beginning.

The conventional data processing method has the following problems. First, a detailed description has to be provided of conditions under which data relating to a device (control unit) having a memory, for example, the kind, number and status of the device, the amount of the data and the like are acquired by means of a user application program. When the device for this purpose is changed, the user application program has to be also altered, and this results in the requirement for a large amount of programming work.

When the overall system including a data acquisition system is started, there is a problem in that the user application program for acquiring data on the device has to be started manually by the user each time the device is changed.

Moreover, when the data acquired from the device are stored in the storage unit, the data are transferred to the storage unit after they are temporarily stored in a buffer area. If, however, the data are stored in the memory or the storage unit when there is insufficient vacant space, the data previously stored in the memory or storage unit may be erased. Consequently, the user application program must check the state of the storage area at all times, which imposes a large load on the user application program, thus reducing the efficiency of the entire system.

Further, when the user application program is being used to transfer the data stored in the memory to the storage unit, the acquisition accuracy may be reduced if there is no room for storing the data newly acquired during the data transfer operation.

SUMMARY OF THE INVENTION

The present invention has been made to solve the above problems, and has as an object the providing a data processing method in which developed data of the contents of a program for acquiring data is stored in a storage unit once the program is started by a main controller, and data acquisition is enabled immediately after the system is started the next time onward.

Another object of the invention is to provide a data processing method which enables setting of conditions for data acquisition by the main controller side in an interactive manner by use of three pictures.

Still another object of the present invention is to provide a data processing method which calculates and minimizes, when acquired data is transferred from a subcontroller to a main controller, the size of a storage area necessary to store data newly acquired during the transfer.

Still another object of the present invention is to provide a data processing method which improves the system efficiency by optimizing at an interval at which a memory area is supervised in accordance with an interval at which a trigger condition for data acquisition is satisfied.

Still another object of the present invention is to provide a data processing method which transfers data so as to minimize the storage area of a storage unit that holds data to be transferred when acquired data is transferred from a subcontroller to a main controller.

Still another object of the present invention is to provide a data processing method which efficiently transfers acquired data to a prescribed main controller when the acquired data is transferred from a subcontroller to a plurality of main controllers.

According to the invention, there is provided a data processing method including a main controller and a subcontroller, wherein the main controller forms, in the form of a text format, a data acquisition condition for a particular subject device from which data is to be acquired so that the data acquisition condition is associated with a label name, the data acquisition condition including a supervisory interval for supervising statuses of the particular subject device and a plurality of subject devices related thereto and operation statuses of the particular subject device and the plurality of subject devices for setting a trigger condition for starting data acquisition. The subcontroller develops and stores, when receiving the label name and the corresponding data acquisition condition from the main controller, the received data acquisition condition in a memory so that the data acquisition condition is associated with the label name. Further, the subcontroller compares, when receiving only the label name from the main controller, the data acquisition condition that is developed and stored in the memory with data of the particular subject device and the plurality of subject devices, acquires data from the particular subject device when the data acquisition condition is satisfied, and transfers the acquired data to the main controller.

BRIEF DESCRIPTION OF THE DRAWINGS

FIG. 9 is developed data by developing the label file in the text format according to the first, second, third and fourth embodiments of the invention;

FIG. 10 is a functional diagram illustrating the function of the data processing apparatus according to the second embodiment of the invention;

FIG. 18 is a block diagram showing the contents of a priority information table according to the fourth embodiment of the invention;

FIG. 19 is a block diagram showing the contents of a request source table according to the fourth embodiment of the invention;

DESCRIPTION OF THE PREFERRED EMBODIMENTS

Figure 1:
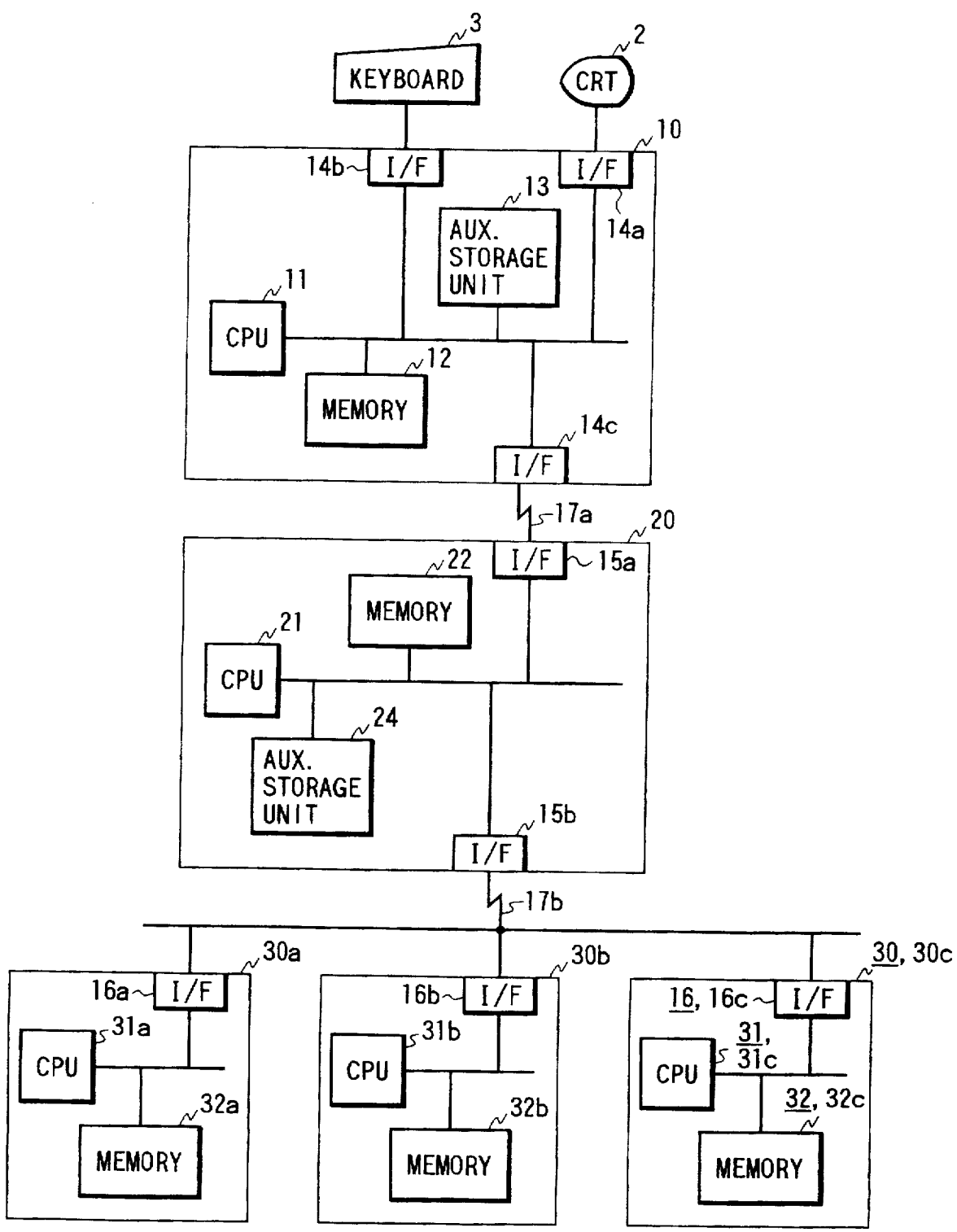
FIG. 1 is a schematic block diagram illustrating the system configuration of a data processing apparatus constructed in accordance with a first embodiment of the present invention.

In the data processing system to which the invention relates, the main controller is of a type that allows data input and setting in an interactive manner. The main controller sets a label name, the supervisory interval of the subject devices that are included in the label name, the number of trigger conditions for starting data acquisition, and the number of particular subject devices from which data is to be acquired in a first display picture. The main controller also sets, as trigger conditions, the subject devices included in the label name which correspond to the number of trigger conditions and operation conditions of the subject devices in a second display picture that follows the first display picture, and sets acquired data sizes of the particular subject devices from which data is to be acquired in a third display picture that follows the second display picture.

The main controller adds a transfer start message to a transfer start portion of the data acquisition condition in the text format which corresponds to the label name, and adds a transfer termination message to a transfer termination portion, and the subcontroller calculates a data transfer rate based on a transfer time from reception of the transfer start message to reception of the transfer termination message and the size of the data contained between the transfer start message and the transfer termination message, and calculates a storage area necessary to store data that is newly acquired by the subcontroller, while the subcontroller transfers the acquired data to the main controller based on the data transfer rate and the data size of the data acquisition condition that is developed and stored in the memory.

The storage area necessary to store data that is newly acquired by the subcontroller while the subcontroller transfers the acquired data to the main controller is calculated by summing the acquisition data sizes of all the label names divided by the respective supervisory intervals for supervising the subject devices, multiplying the resulting sum value by the transfer time of data to the main controller, and adding the size of the data to be transferred to the main controller to a resulting product value.

The subcontroller supervises, at a prescribed supervisory interval, the statuses of the particular subject device from which data is to be acquired and the plurality of subject devices related thereto, and determines a new supervisory interval by determining the number of occurrences in the prescribed supervisory interval of events that the trigger condition for starting data acquisition is satisfied and differences between time points of the occurrences, calculating an average of occurrence periods of trigger condition satisfaction by dividing a sum of the differences between the time points of the occurrences by the number of occurrences, multiplying the prescribed supervisory interval by a total number of label names minus one, adding the average of the occurrence periods to a resulting product value, and dividing a resulting sum value by the total number of label names.

When the trigger condition for starting data acquisition is not satisfied in a prescribed supervisory interval for supervising the statuses of the subject devices, a new supervisory interval is determined by measuring the period until the trigger condition is first satisfied, multiplying the prescribed supervisory interval by the total number of label names minus one, adding the period until the trigger condition is first satisfied to a resulting product value, and dividing the resulting sum value by the total number of label names.

The subcontroller temporarily stores in a memory the data acquired from the particular subject device in accordance with the label name, and transfers the acquired data corresponding to a plurality of label names to the main controller in accordance with amounts of the acquired data.

There is provided another data processing method including a plurality of main controllers and a subcontroller, wherein each of the plurality of main controllers has an identifier to be used for discrimination from the other main controllers. The main controllers determine, in the form of a text format, a data acquisition condition for a particular subject device from which data is to be acquired so that the data acquisition condition is associated with a label name. The data acquisition condition includes a supervisory interval for supervising statuses of the particular subject device and a plurality of subject devices related thereto and operation statuses of the particular subject device and the plurality of subject devices for setting a trigger condition for starting data acquisition. The subcontroller develops and stores, when receiving the label name and the corresponding data acquisition condition from the main controller, the received data acquisition condition in a memory so that the data acquisition condition is associated with the label name. The subcontroller compares, when receiving only the identifier and the label name from the main controller, the data acquisition condition that is developed and stored in the memory with data of the particular subject device and the plurality of subject devices, acquires data from the particular subject device when the data acquisition condition is satisfied, temporarily stores the acquired data in a memory so that the data is associated with the label name and the identifier, compares an identifier corresponding to the acquired data with identifiers of the plurality of main controllers that are requesting data transfer, and transfers the data corresponding to the label name having a coincidence-found identifier to the main controller having the coincidence-found identifier in accordance with an amount of the data.

According to the invention, there is provided a data processing method including a main controller and a subcontroller, wherein the main controller determines, in the form of a text format, a data acquisition condition for a particular subject device from which data is to be acquired so that the data acquisition condition is associated with a label name, the data acquisition condition including a supervisory interval for supervising statuses of the particular subject device and a plurality of subject devices related thereto and operation statuses of the particular subject device and the plurality of subject devices for setting a trigger condition for starting data acquisition. The subcontroller develops and stores, when receiving the label name and the corresponding data acquisition condition from the main controller, the received data acquisition condition in a memory so that the data acquisition condition is associated with the label name, and compares, when receiving only the label name from the main controller, the data acquisition condition that is developed and stored in the memory with data of the particular subject device and the plurality of subject devices, acquires data from the particular subject device when the data acquisition condition is satisfied, and transfers the acquired data to the main controller. Therefore, in accordance with the contents of the data received from the main controller, the subcontroller develops and stores the data acquisition conditions in the memory, or acquires data while referring to the data acquisition conditions stored in the memory and transfers the acquired data to the main controller.

The main controller is of a type that allows data input and setting in an interactive manner. The main controller sets a label name, the supervisory interval of the subject devices that are included in the label name, the number of trigger conditions for starting data acquisition, and the number of particular subject devices from which data is to be acquired in a first display picture, sets, as trigger conditions, the subject devices included in the label name which correspond to the number of trigger conditions and operation conditions of the subject devices in a second display picture that follows the first display picture, and sets acquired data sizes of the particular subject devices from which data is to be acquired in a third display picture that follows the second display picture. Therefore, data are input and set in accordance with instructions appearing on the display screen in the order of the setting conditions for the respective label names, the setting conditions for the respective trigger conditions, and the setting conditions for the respective acquisition data.

The main controller adds a transfer start message to a transfer start portion of the data acquisition condition in the text format which corresponds to the label name, and adds a transfer termination message to a transfer termination portion, and the subcontroller calculates a data transfer rate based on a transfer time from reception of the transfer start message to reception of the transfer termination message and a size of data that is contained between the transfer start message and the transfer termination message, and calculates a storage area necessary to store data that is newly acquired by the subcontroller while the subcontroller transfers the acquired data to the main controller based on the data transfer rate and the data size of the data acquisition condition that is developed and stored in the memory. Therefore, data newly acquired during transfer of the already acquired data can be stored without losing the former.

The storage area necessary to store data that is newly acquired by the subcontroller while the subcontroller transfers the acquired data to the main controller is calculated by summing the acquisition data sizes of all the label names divided by the respective supervisory intervals for supervising the subject devices, multiplying the resulting sum value by the transfer time of data to the main controller, and adding the size of the data to be transferred to the main controller to a resulting product value. Therefore, the storage area is calculated as an area for the acquired data of all the label names that are acquired during the transfer time of the acquired data added with the data to be transferred.

The subcontroller supervises, at the prescribed supervisory interval, the statuses of the particular subject device from which data is to be acquired and the plurality of subject devices related thereto, and determines a new supervisory interval by determining the number of occurrences in the prescribed supervisory interval of events that the trigger condition for starting data acquisition is satisfied and differences between time points of the occurrences, calculating the average of occurrence periods of trigger condition satisfaction by dividing the sum of the differences between the time points of the occurrences by the number of occurrences, multiplying the prescribed supervisory interval by the total number of label names minus one, adding the average of the occurrence periods to a resulting product value, and dividing the resulting sum value by the total number of label names. Therefore, when the trigger condition is satisfied in the prescribed supervisory interval, the supervisory interval is always corrected using the average of the occurrence periods of trigger condition satisfaction.

When the trigger condition for starting data acquisition is not satisfied in a prescribed supervisory interval for supervising the statuses of the subject devices, a new supervisory interval is determined by measuring the period until the trigger condition is first satisfied, multiplying the prescribed supervisory interval by the total number of label names minus one, adding the period until the trigger condition is first satisfied to the resulting product value, and dividing the resulting sum value by the total number of label names. Therefore, when the trigger condition is not satisfied in the prescribed supervisory interval, the supervisory interval is corrected using the period in which the trigger condition is first satisfied.

The subcontroller temporarily stores in a memory the data acquired from the particular subject device in accordance with the label name, and transfers the acquired data corresponding to a plurality of label names to the main controller in accordance with amounts of the acquired data. Therefore, the storage capacity necessary to store the acquired data can be minimized.

There is provided another data processing method including a plurality of main controllers and a subcontroller, wherein each of the plurality of the main controller has an identifier to be used for discrimination from the other main controllers. The main controllers determine, in the form of a text format, a data acquisition condition for a particular subject device from which data is to be acquired so that the data acquisition condition is associated with a label name, the data acquisition condition including a supervisory interval for supervising statuses of the particular subject device and a plurality of subject devices related thereto and operation statuses of the particular subject device and the plurality of subject devices for setting a trigger condition for starting data acquisition. The subcontroller develops and stores, when receiving the label name and the corresponding data acquisition condition from the main controller, the received data acquisition condition in a memory so that the data acquisition condition is associated with the label name. The subcontroller compares, when receiving only the identifier and the label name from the main controller, the data acquisition condition that is developed and stored in the memory with data of the particular subject device and the plurality of subject devices, acquires data from the particular subject device when the data acquisition condition is satisfied, and temporarily stores the acquired data in a memory so that the data is associated with the label name and the identifier. The subcontroller then compares an identifier corresponding to the acquired data with identifiers of the plurality of main controllers that are requesting data transfer, and transfers the data corresponding to the label name having a coincidence-found identifier to the main controller having the coincidence-found identifier in accordance with the amount of the data. Therefore, the acquired data is transferred to a particular one of a plurality of main controllers, and the storage capacity necessary to store the acquired data can be minimized.

Embodiment 1

Referring to FIGS. 1 through 9 inclusive, a description will subsequently be given of a data processing apparatus embodying the present invention. This data processing apparatus makes it unnecessary to describe detailed conditions under which data on a device having a memory is acquired in a user application program. When a data acquisition program is started by a main controller only one time, the data developed by developing the contents of the program is stored as start-up data in a storage unit, thus making data acquisition possible immediately after the system is started second time and thenceforth.

Figure 2:
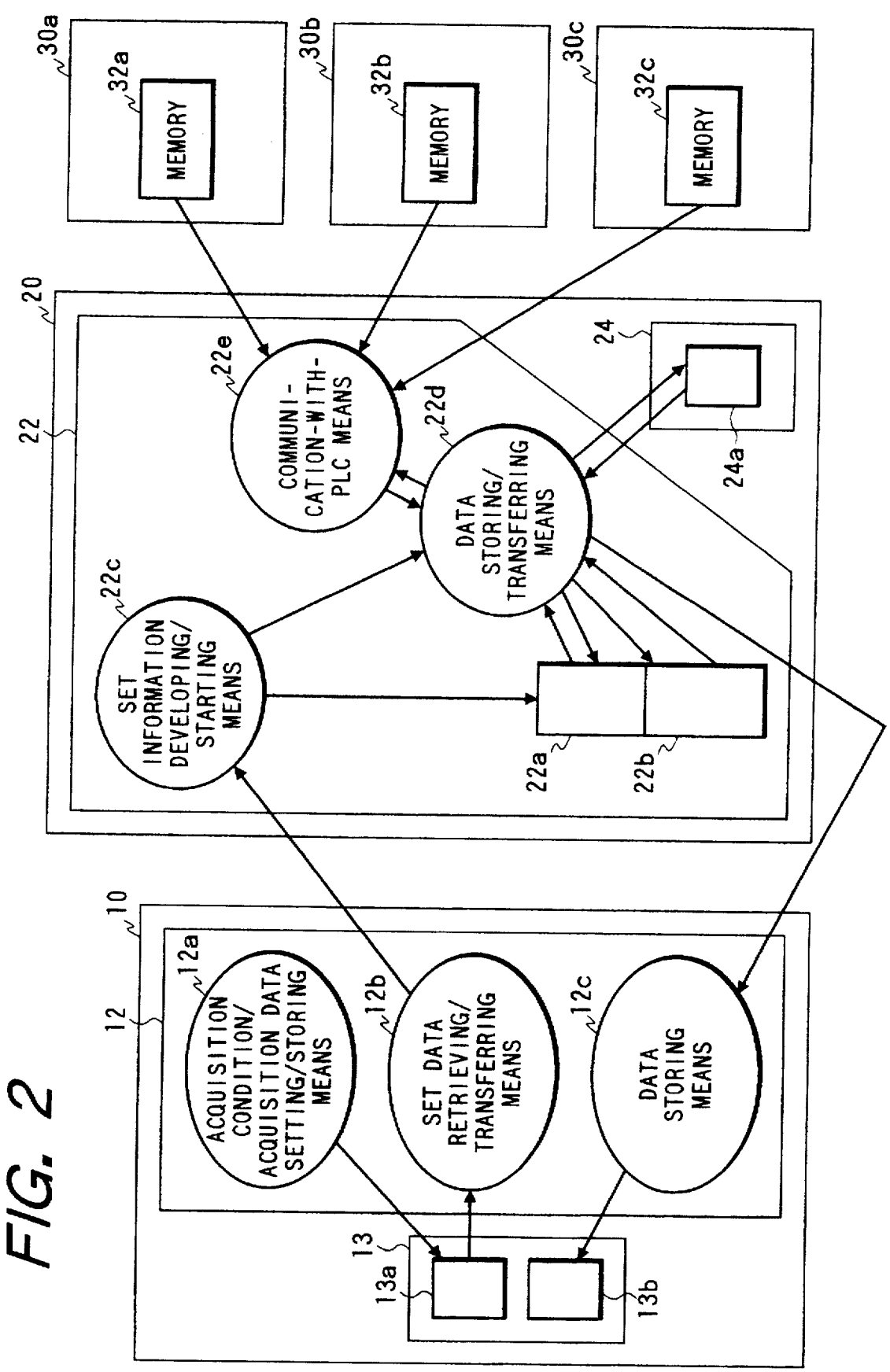
FIG. 2 is a functional diagram showing the function of the data processing apparatus of the first embodiment of the present invention.
Figure 3:
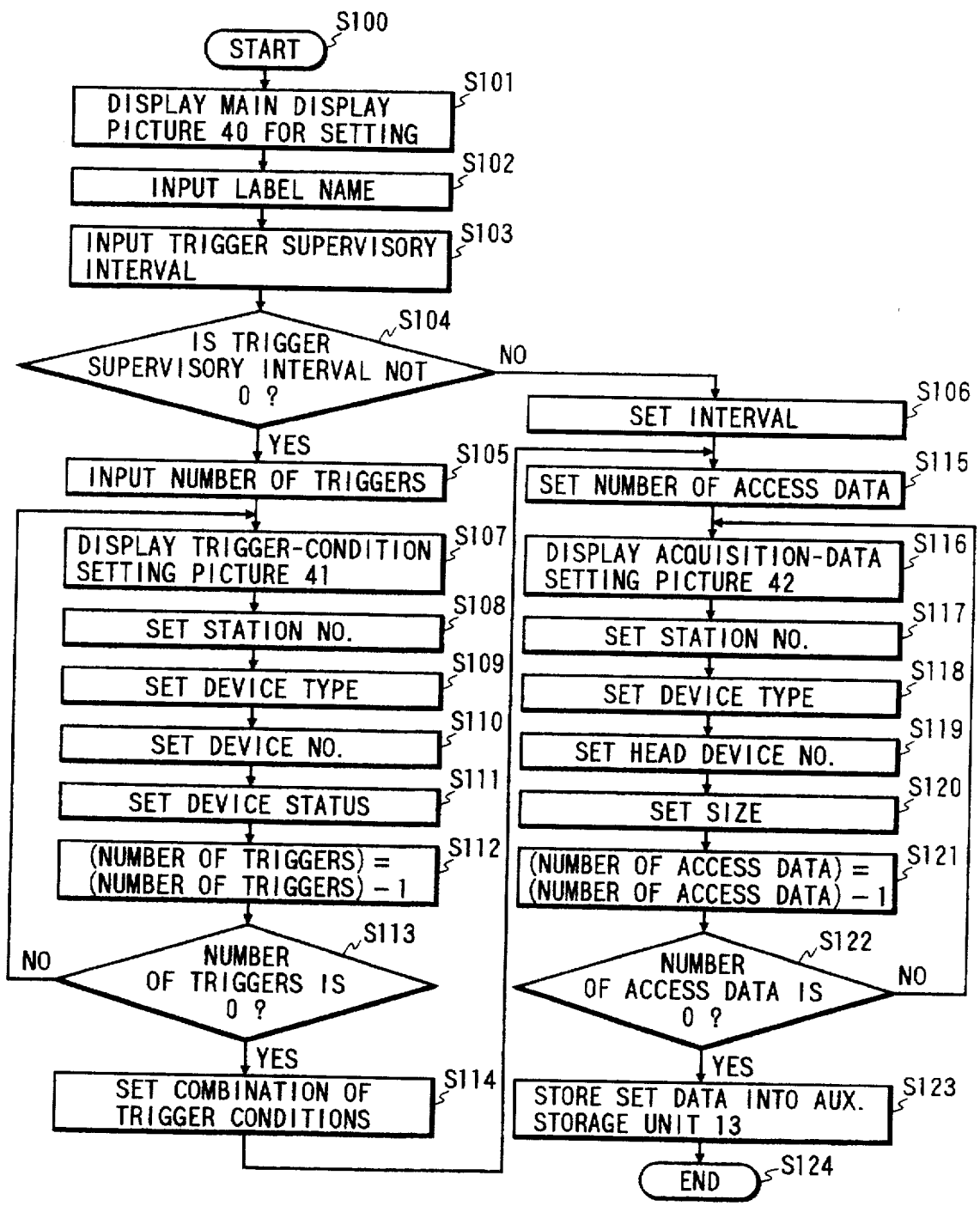
FIG. 3 is a flowchart showing the acquisition conditions of a main controller and the operation of means for setting and storing acquisition data according to the first embodiment of the invention.
Figure 4:
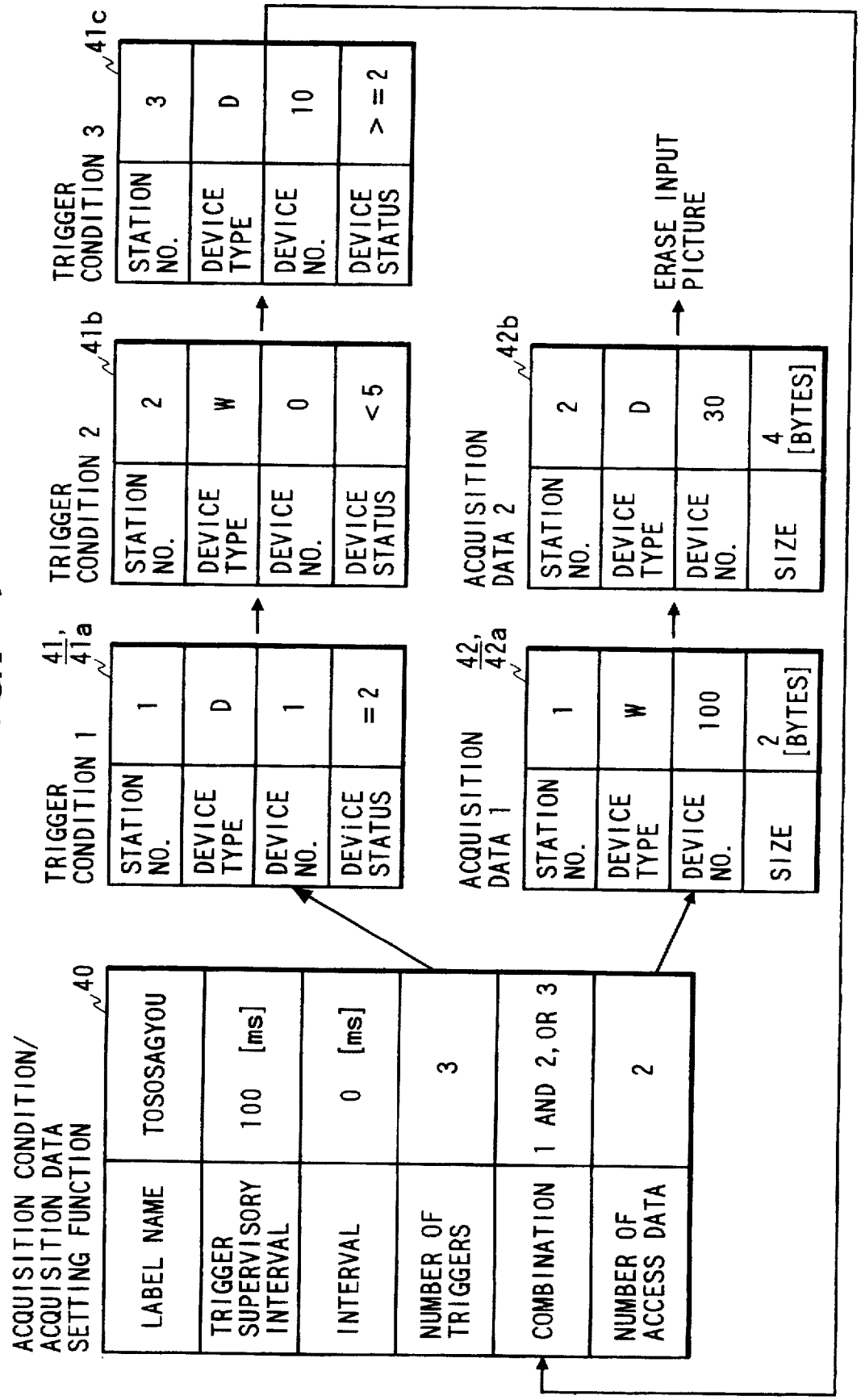
FIG. 4 shows a configuration of display pictures used in setting acquisition conditions and acquisition data according to the first embodiment of the invention.
Figures 5, 6:
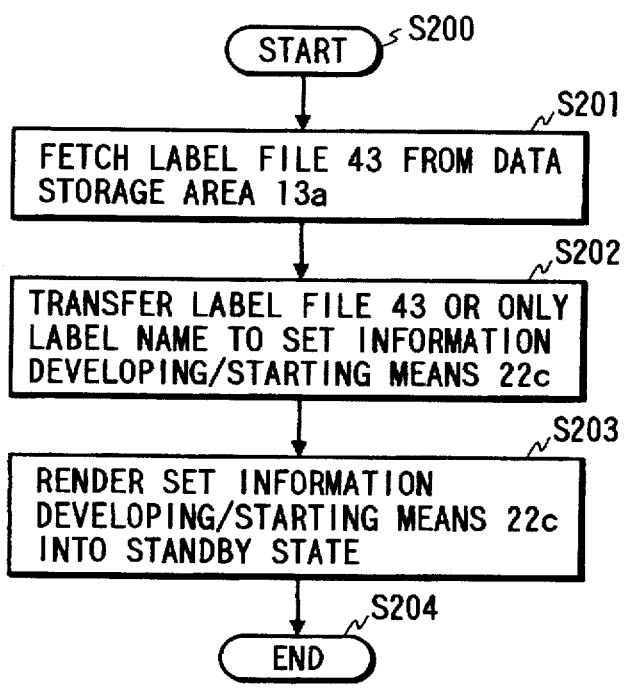
FIG. 5 depicts a label file in a text format according to the first, second and third embodiments of the invention.
FIG. 6 is a flowchart showing the operation of set data retrieving/transferring means of the main controller according to the first embodiment of the invention.
Figure 7:
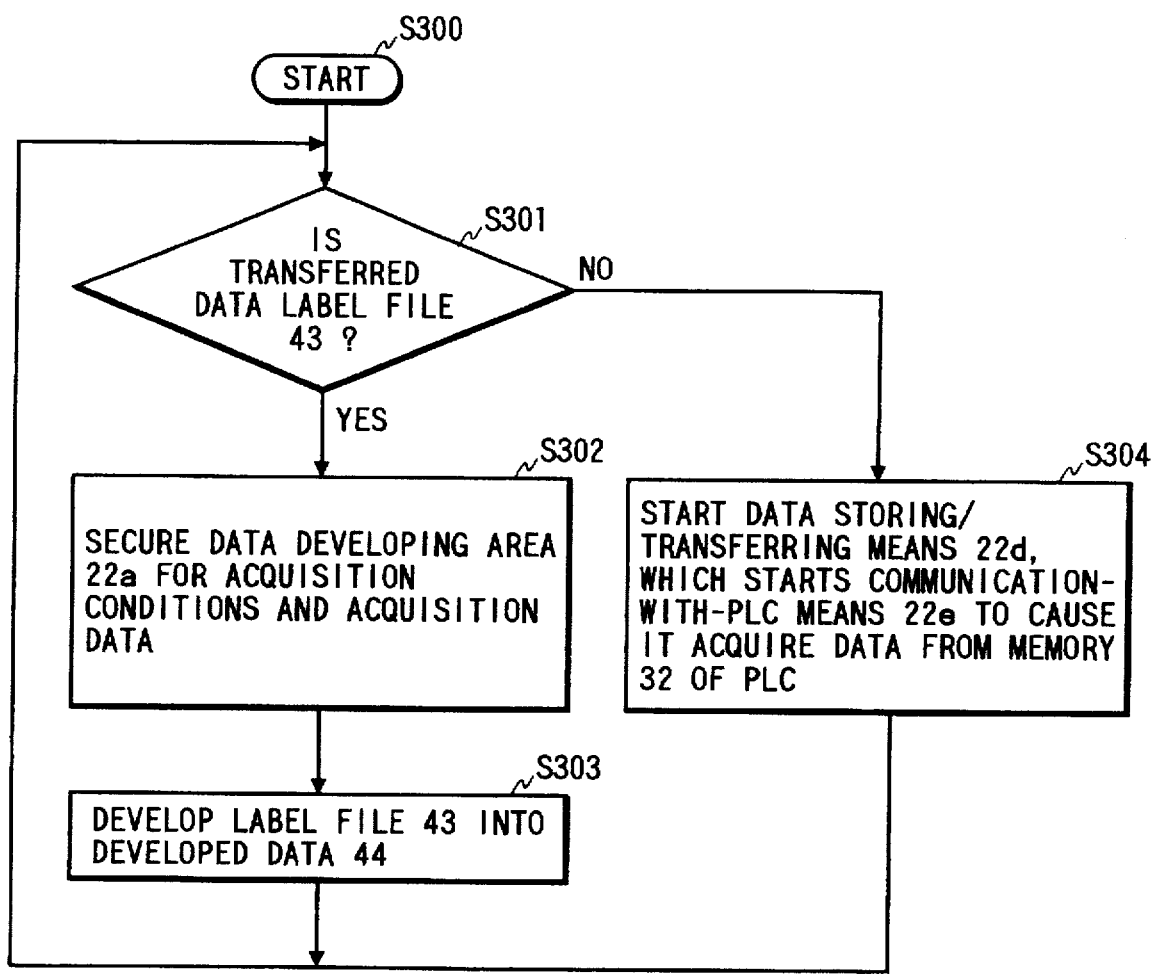
FIG. 7 is a flowchart showing the operation of means for developing/starting set information of a subcontroller.
Figure 8:
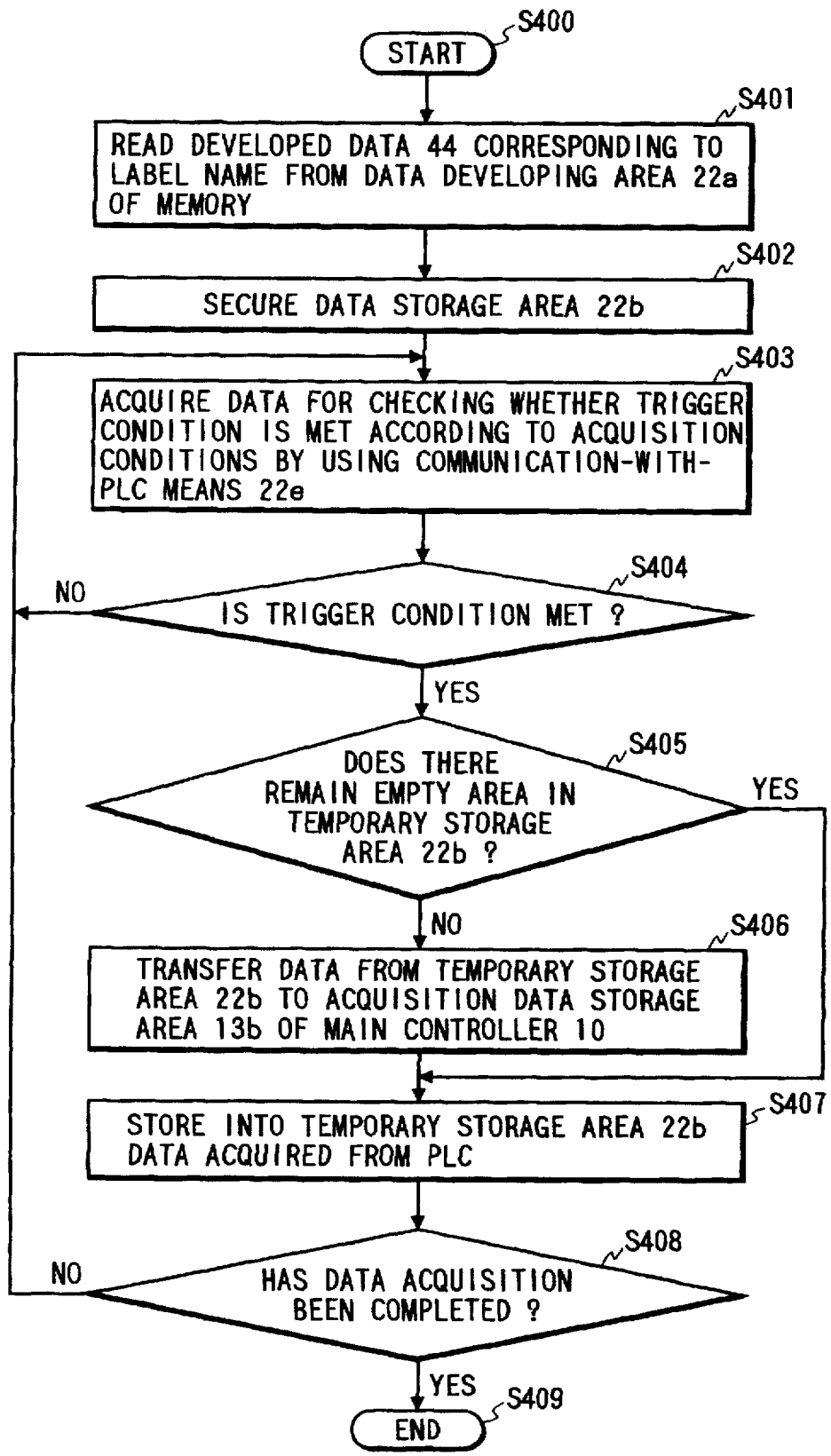
FIG. 8 is a flowchart showing the operation of means for storing/transferring data of the subcontroller according to the first embodiment of the invention.

FIG. 1 is a schematic block diagram illustrating the system configuration of a data processing apparatus; FIG. 2 a functional diagram showing the function of the data processing apparatus; FIG. 3 is a flowchart showing the acquisition conditions of a main controller 10, which will be described later, and the operation of means 12a for setting and storing acquisition data; FIG. 4 shows layouts of display pictures when acquisition conditions and acquisition data are set; FIG. 5 depicts a label file in a text format; FIG. 6 is a flowchart showing the operation of means 12b for retrieving/transferring set data of the main controller 10 as will be described later; FIG. 7 is a flowchart showing the operation of means 22c for developing/starting set information of a subcontroller 20 which will be described later; FIG. 8 is a flowchart showing the operation of means 22d for storing/transferring data of the subcontroller 20 as will be described later; and FIG. 8 developed data by developing a label file 43 in the text format on the memory, as will also be described later. In these drawings, like reference characters and numerals designate corresponding components.

In FIG. 1, reference numeral 10 denotes a main controller for defining acquisition conditions and data, and storing acquisition data from a subcontroller 20 as will be described later; 11, a CPU of the main controller 10; 12, a memory of the main controller 10; 13, an auxiliary storage unit of the main controller 10; 14a, an interface with CRT 2; 14b an interface with a keyboard 3; 14c, an interface with a subcontroller 20 which will be described later; 15a, an interface with the main controller 10; 16, 16a, 16b, 16c interfaces with respective PLCs 30, 30a, 30b, 30c; 17a and 17b, a communication line such as a local area network; 20, a subcontroller for acquiring data on PLC 30 as will be described later; 21, a CPU of the subcontroller 20; 22, a memory of the subcontroller 20; 24, an auxiliary storage unit of the subcontroller 20; 30, 30a, 30b, 30c, PLCs; 31, 31a, 31b, 31c, CPUs of the respective PLCs 30, 30a, 30b, 30c; and 32, 32a, 32b, 32c, memories of the respective PLCS.

In FIGS. 2, 4, 5 and 9, reference numeral 12a denotes means provided in the memory 12 for setting conditions of data acquisition such as a program, means provided in the memory 12 for setting and storing acquisition conditions and acquisition data, this means also having the function of preparing and storing files; 12b, means provided in the memory 12 for retrieving/transferring set data, this means also having the functions of transferring files, such as the program, and of adding messages; 12c, means provided in the memory 12 for storing data such as the program; 13a, a data storage area for setting the acquisition conditions and acquisition data in the auxiliary storage unit 13; 13b, a storage area for storing acquisition data from the PLC in the auxiliary storage unit 13; 22a, a data developing area for setting acquisition conditions and acquisition data in the memory 22; 22b, a storage area provided in the memory 22 for temporarily storing acquisition data from PLC; 22c, means provided in the memory 22 for developing/starting set information, this means also functioning as means for preparing the developed data such as the program; 22d, means provided in the memory 22 for storing/transferring data, this means also functioning as means for comparing conditions of data acquisition such as the program, means for data acquisition, means for storing acquisition data, means for computing a storage area, means for storing the time the conditions are satisfied, priority information storage means, priority data transfer means and request source information storage means; 22e, communication means provided in the memory for communicating with PLC about the program; 24a, a storage area of data developed for setting the acquisition conditions and acquisition data in the auxiliary storage unit 24 as nonvolatile storage means; 40, a main display serving as a first display for displaying the acquisition conditions and acquisition data on the CRT 2 connected to the main controller 10; 41, a display serving as a second display on the CRT 2 connected to the main controller 10; 41a, 41b, 41c, displays for setting trigger conditions 1, 2, 3 respectively; 42, a display for use setting acquisition data as a third display on the CRT 2 connected to the main controller 10; 42a, 42b, displays for setting acquisition data 1, 2 respectively; 43, a label file in the text format; and 44, data developed on the memory.

The operation will subsequently be described. Referring first to FIG. 2, the operation of the above system will be described schematically.

The operator inputs data for setting acquisition conditions and acquisition data, the data which is shown in FIG. 4 and will be described in detail later, for example, via the keyboard 3. The means 12a for setting and storing acquisition conditions and acquisition data of the main controller 10 stores these data in the data storage area 13a for setting the acquisition conditions and acquisition data, these data being in the form of a data file or the label file 43 in the text format shown in FIG. 5 and which will be described in detail later. Subsequently, the means 12b for retrieving/transferring set data reads the label file 43 in the text format from the data storage area 13a for setting acquisition conditions and acquisition data and transfers the label file 43 in the text format to the means 22c for developing/starting set information in the memory 22 of the subcontroller 20. The means 22c for developing/starting set information rearranges the data so as to make the data easy to refer to during use, that is, develops them in the memory to convert them to the developed data 44, as will be described in detail in FIG. 9, and stores them in the data developing area 22a for setting acquisition conditions and acquisition data.

Then the means 22d for storing/transferring data refers to the developed data 44 stored in the data developing area 22a for setting acquisition conditions and acquisition data and compares that data with what is stored in the memory 32 of the corresponding PLC 30 and obtained by the communication means 22e so as the check whether the trigger condition is satisfied. When the trigger condition is satisfied, further, the means 22d for storing/transferring data acquires the data stored in the memory 32 of the PLC 30 using the communication means 22e with the PLC by reference to the developed data 44 stored in the data developing area 22a for setting acquisition conditions and acquisition data and stores the data in the storage area 22b for temporarily storing acquisition data from the PLC. At this time, data to be stored in the storage area 22b for temporarily storing acquisition data from the PLC are stored in turn from its head area and when the this area becomes filled up, the means 22d for storing/transferring data notifies the means 12c for storing data of the main controller 10 of the filled state and transfers the data stored in the storage area 22b for temporarily storing acquisition data from the PLC to the storage area 13b for storing acquisition data from the PLC of the main controller 10.

Referring to FIGS. 3–5, a detailed description will subsequently be given of the operation of the means 12a for setting and storing acquisition conditions and acquisition data of the main controller 10. At STEP S100 of the flowchart shown in FIG. 3, the operator starts the main controller 10 via the keyboard 3. At STEP S101, the main display 40 for setting acquisition conditions and acquisition data of FIG. 4 is displayed on the screen of the CRT 2. At STEP S102 first, a label name as a key of the means 12a for setting and storing acquisition conditions and acquisition data is input. The label name plays the role of a signboard for defining acquisition conditions and acquisition data and as shown in FIG. 4, it is "TOSOSAGYOU" in the case of the main display 40. At STEP S103, a trigger supervisory interval is input and it is "100" on the main display 40 of FIG. 4. Subsequently at STEP S104, it is checked whether the trigger supervisory interval is zero. If it is zero, the trigger condition is judged absent. At STEP S106, a predetermined interval is set to carry out data acquisition and the flow bypasses intermediate steps and goes to STEP S115, whereas when it is not zero, the number of triggers is input at STEP S105. As the trigger supervisory interval has been designated on the main display 40 of FIG. 4, the interval is "0" and the number of triggers is "3".

Where the trigger conditions should be set, the display 41a for setting the trigger condition 1 in place of the main display 40 is displayed on the screen of the CRT 2. At STEP S108, the station number of PLC for data acquisition is set and it is "1" on the display 41a for setting the trigger condition 1 of FIG. 4. At STEP S109, a device type is set and it is "D" on the display 41a for setting the trigger condition 1 of FIG. 4. At STEP S110, a device No. is set and it is "1" on the display 41a for setting the trigger condition 1 of FIG. 4. At STEP S111, the status of the device is set and it is "=2" on the display 41a for setting the trigger condition 1 and this means the trigger condition 1 is satisfied when the device becomes equal to "2". At STEP S112, the number of triggers is decremented by 1 and at STEP S113, the number of triggers set on the main display 40 of FIG. 4 is checked to see whether it becomes zero.

Unless the number of triggers thus set becomes zero, the flow returns to STEP S107 where the display 41b for setting the second trigger condition 2 is displayed and like the trigger condition 1, the trigger condition 2 is set likewise at STEPs S108–S111. This is also the case with the trigger condition 3. What is meant by the trigger condition 1 in this case is that the trigger condition is satisfied when the value of No. 1 of the device type D at PLC No. 1 becomes 2. What is meant by the trigger conditions 2, 3 is that the trigger condition is satisfied when the values of Nos. 0, 10 of the device types W, D at PLC Nos. 2, 3 become less than 5 and not less than 2, respectively.

When the number of triggers become zero, moreover, the main display 40 of FIG. 4 is restored on the screen of the CRT 2 and at STEP S114, a combination of trigger conditions is set. This means "1 and 2, or 3" on the main display 40 of FIG. 4, that is, the trigger condition is satisfied when the trigger conditions 1 and 2 both are satisfied or the trigger condition 3 is satisfied. At STEP S115, the number of access data is subsequently set and it is "2" on the main display 40 of FIG. 4.

At STEP S116, further, the display 42a for setting acquisition data 1 is displayed on the CRT 2 and at STEP S117, the station number of PLC for data acquisition is set and it is "1" on the display 42a for setting the acquisition data 1 of FIG. 4. At STEP S118, a device type is set and it is "W" on the display 42a for setting the acquisition data 1 of FIG. 4. At STEP S119, there is set a head device No. for designating which one of the device types W is started and it is "100" on the display 42a for setting the acquisition data 1 of FIG. 4. At STEP S120, data size is set and it is "2" on the display 42a for setting the acquisition data 1 of FIG. 4. Then at STEP S121, the number of access data is decremented by 1 and at STEP S122, the number of access data set on the main display 40 of FIG. 4 is checked to see whether it becomes zero.

Unless the number of access data thus set becomes zero, the flow returns to STEP S116 where the display 42b for setting the second acquisition data 2 is displayed and like the acquisition data 1, the acquisition data 2 is set likewise at STEPs S117–S120. What is meant by the acquisition data 1 in this case is that 2 [bytes] of data are acquired from a position where the head device No. of the device type W at PLC No. 1 is 100. What is meant by the acquisition data 2 is that 4 [bytes] of data are acquired from a position where the head device No. of the device type D at PLC No. 2 is 30.

When the number of access data thus set becomes zero, the means 12a for setting and storing acquisition conditions and acquisition data stores the data for setting the set acquisition conditions and acquisition data in the data storage area 13a for setting acquisition conditions and acquisition data in the auxiliary storage unit 13 of the main controller 10 as the label file 43 in the text format shown in FIG. 5. At STEP S124, further, data setting is terminated and the input display is erased.

In this case, the contents of the label file 43 in the text format shown in FIG. 5 correspond to the set data from the display for setting acquisition conditions and acquisition data as shown in FIG. 4 on a one-to-one basis in the order of setting. "USTART" carried by the label file 43 in the text format means it is returned to the main display 40, so that the combination is set on the main display 40 after the setting of the trigger condition 3 on the display 41c is terminated in FIG. 4. Moreover, "UEND" means the display 42 for setting acquisition data is subsequently activated after the setting operation on the main display 40 is terminated.

A detailed description will subsequently be given of the operation of the means 12b for retrieving/transferring set data of the main controller 10 by reference to a flowchart of FIG. 6. At STEP S200 first, the operator starts the main controller 10 by inputting only a label name via the keyboard 3 and at STEP S201, the means 12b for retrieving/transferring set data fetches the label file 43 in the text format from the data storage area 13a for setting acquisition conditions and acquisition data in the auxiliary storage unit 13. At STEP S202, the label file 43 in the text format or only the label name is transferred to the means 22c for developing/starting set information. At STEP S203, further, the means 22c for developing/starting set information is placed in the execution standby state and the operation is terminated at STEP S204.

Referring to a flowchart of FIG. 7, a detailed description will be given of the operation of the means 22c for developing/starting set information of the subcontroller 20. When the subcontroller 20 is started, the means 22c for developing/starting set information is automatically started and caused to remain in the execution standby state by the means 12b for retrieving/transferring set data of the main controller 10 at STEP S300. At STEP S301, data transferred from the means 12b for retrieving/transferring set data is checked to see whether it is the label file 43 in the text format.

When the data thus transferred is the label file 43 in the text format, the data developing area 22a for setting acquisition conditions and acquisition data is stored in the memory 22 of the subcontroller 20. Subsequently at STEP S303, the label file 43 in a text format is developed to form the developed data 44 of FIG. 9 in the data developing area 22a for setting acquisition conditions and acquisition data. The flow then returns to STEP S301 and the next data transfer is waited for. In this manner, a plurality of label files in the text format transferred from the main controller 10 are processed in the same manner, and a plurality of developed data corresponding to the label name are stored in the data developing area 22a for setting acquisition conditions and acquisition data.

When the data thus transferred is not the label file 43 in the text format but only the label name, it means the data 44 already developed exists in the data developing area 22a for setting acquisition conditions and acquisition data. Therefore, the means 22c for developing/starting set information starts the means 22d for storing/transferring data at STEP S304, and further the means 22d for storing/transferring data starts the communication means 22e with the PLC so as to acquire the data stored in the memory 32 of the PLC 30. The flow again returns to STEP S301 and waits for the next data transfer.

Referring to FIG. 9, a detailed description will further be given of the data 44 developed on the data developing area 22a for setting acquisition conditions and acquisition data by reference to the contents of the label file 43 in the text format of FIG. 5. With "TOSOSAGYOU" as a label name, data indicating the contents are developed in a 0-3C byte area. More specifically, the trigger supervisory interval "100" is developed and stored in a 0-2 byte area; the interval "0" in a 2-4 byte area; the number of triggers "3" in a 4-6 byte area; the station number "1" in a 6-8 byte area; the device type "D" in a 8-A byte area; the device No. "1" in an A-C byte area; the status of the device "=2" in C-10 byte area; the station number "2" in a 10-12 byte area; the device type "W" in a 12-14 byte area; the device No. "0" in a 14-16 byte area; the device status "<5" in a 16-1A byte area; the station number "3" in a 1A-1C byte area; the device type "D" in a 1C-1E byte area; the device No. "10" in a 1E-20 byte area; the device status "≧2" in a 20-24 byte area; the combination number "2" in a 24-26 byte area; the combination "1 and 2, or 3" in a 26-2A byte area; the number of access data "2" in a 2A-2C byte area; the station number "1" in a 2C-2E byte area; the device type "W" in a 2E-30 byte area; the head device No. "100" in a 30-32 byte area; the size "2" in a 32-34 byte area; the station number "2" in a 34-36 byte area; the device type "D" in a 36-38 byte area; and the head device No. "30" in a 38-3A byte area; the size "4" in a 3A-3C byte area.

A detailed description will subsequently be given of the operation of the means 22d for storing/transferring data by reference to FIG. 8. At STEP S400 first, the means 22d for storing/transferring data is started by the means 22c for developing/starting set information. At STEP S401, the means 22d for storing/transferring data receives a label name, for example, "TOSOSAGYOU" from the means 22c for developing/starting set information and reads the contents of the developed data 44 corresponding to the label name from the data developing area 22a for setting acquisition conditions and acquisition data. At STEP S402, the storage area 22b for temporarily storing acquisition data from the PLC is stored in the memory 22 by reference to the contents of the developed data 44. At STEP S403, the means 22d for storing/transferring data acquires data for checking for satisfaction of the trigger condition by using the communication means 22e with the PLC from the memory 32 of the PLC 30 in accordance with the acquisition conditions shown in FIG. 4. At STEP S404, it is checked whether the trigger condition is met.

If the trigger condition is not met, the flow returns to STEP S403. If the trigger condition is met, it is checked at STEP S405 whether there remains an empty area in the storage area 22b for temporarily storing acquisition data from the PLC. If there is no empty area, the acquired data is transferred to the storage area 13b for storing acquisition data from the PLC of the main controller 10 at STEP S406. At STEP S407, the data acquired from the PLC is stored in the storage area 22b for temporarily storing acquisition data from the PLC. If there remains an empty area, the flow bypasses STEP S406 and goes to STEP S407, where the data acquired from the PLC is stored in the storage area 22b for temporarily storing acquisition data from the PLC. At STEP S408, it is checked whether a termination instruction has been received from the means 22c for developing/starting set information. If the termination instruction has not been received, the flow returns to STEP S403. When the termination instruction has been received, the operation is finished at STEP S409.

A description will subsequently be given of the storage area of data 24a, developed for setting acquisition conditions and acquisition data in the auxiliary storage unit 24 of the subcontroller 20. First, the means 12b for retrieving/transferring set data of the main controller 10 transfers the label file 43 in the text format to the means 22c for developing/starting set information. The means 22c for developing/starting set information develops the label file 43 in the text format on the memory and converts to the developed data 44, which is stored in the data developing area 22a for setting acquisition conditions and acquisition data. Subsequently, the means 22d for storing/transferring data transfers the developed data 44 corresponding to the plurality of label names stored in the data developing area 22a for setting acquisition conditions and acquisition data to the storage area of data 24a developed for setting acquisition conditions and acquisition data, and stores them therein. These developed data 44 are kept in storage even if the power supply is cut off because of a power mains interruption.

A description will further be given of a case where the system is started after the developed data 44 corresponding to the plurality of label names are stored in the storage area of data 24a developed for setting acquisition conditions and acquisition data. When the operator feeds a label name via the keyboard 3, the label name is supplied from the main controller 10 to the means 22c for developing/starting set information, which starts the means 22d for storing/transferring data. The means 22d for storing/transferring data checks whether there exists the label name corresponding to the data developing area 22a for setting acquisition conditions and acquisition data. When such a label name is non-existent, the means 22d for storing/transferring data transfers the developed data 44 of a corresponding label name to the data developing area 22a for setting acquisition conditions and acquisition data. When, moreover, the developed data 44 of the corresponding label name exists, the means 22d for storing/transferring data reads the contents of the developed data 44.

Then, the means 22d for storing/transferring data refers to the contents of the developed data 44, stores the storage area 22b for temporarily storing acquisition data from the PLC on the memory 22 and acquires data for checking for satisfaction of the trigger condition from the memory 32 of the PLC 30, by using the communication means 22e with the PLC in accordance with the acquisition conditions shown in FIG. 4. If the trigger condition is met, the means 22d for storing/transferring data checks whether there is a vacancy in the storage area 22b for temporarily storing acquisition data from the PLC, and when there is no vacant area, transfers the acquired data to the storage area 13b for storing acquisition data from the PLC of the main controller 10 to secure a vacant area and stores the data acquired from the PLC in the storage area 22b for temporarily storing acquisition data from the PLC. When there is a vacant area, however, the data acquired from the PLC is stored in the storage area 22b for temporarily storing acquisition data from the PLC.

As set forth above, data for defining the setting of acquisition conditions and acquisition data when the data stored in the memory 32 of the PLC 30 intended for data acquisition are acquired are converted into a group with a label name as a key word, and the plurality of label files 43 in the text format are prestored. Consequently, any data can be acquired only by designating the label name concerned when data is acquired from the memory 32 of the PLC 30 by actually starting the system. It is therefore unnecessary to input data for setting acquisition conditions and acquisition data each time the data intended for acquisition by the system is altered. The operating efficiency of the system can thus be improved.

When the data for setting acquisition conditions and acquisition data is altered, moreover, it is only needed to input data in accordance with the instructions given on the data setting display shown in FIG. 4. Consequently, the trigger and acquisition data conditions can simply be changed to ensure that development and maintenance steps are made reducible.

Since the required work is divided between the main controller 10 for setting acquisition conditions and acquisition data and the subcontroller 20 for acquiring data by communicating with the PLC 30, the load of the main controller 10 is reduced, and moreover it is also possible to simply build a large scale system in which one main controller 10 is used to control a plurality of subcontrollers 20.

If developed data 44 corresponding to respective label names are stored in the storage area of data 24a developed for setting acquisition conditions and acquisition data in the auxiliary storage unit 24 of the subcontroller 20, data can be acquired from the memory 32 of the PLC 30 only by designating a label name with the data thus stored as start up data when the system is started. Consequently, the time required until data acquisition is commenced after the system is started can greatly be shortened. Moreover, the advantage is that the data developed and stored in the storage area of data 24a developed for setting acquisition conditions and acquisition data are prevented from being lost even if the power is interrupted.

Embodiment 2

Referring to FIGS. 5 and 9 through 13, a description will further be given of another data processing apparatus embodying the present invention, wherein the size of a storage area for storing data newly acquired while acquisition data is transferred from one storage unit to another is minimized in the storage unit holding data to be transferred.

Figure 11:
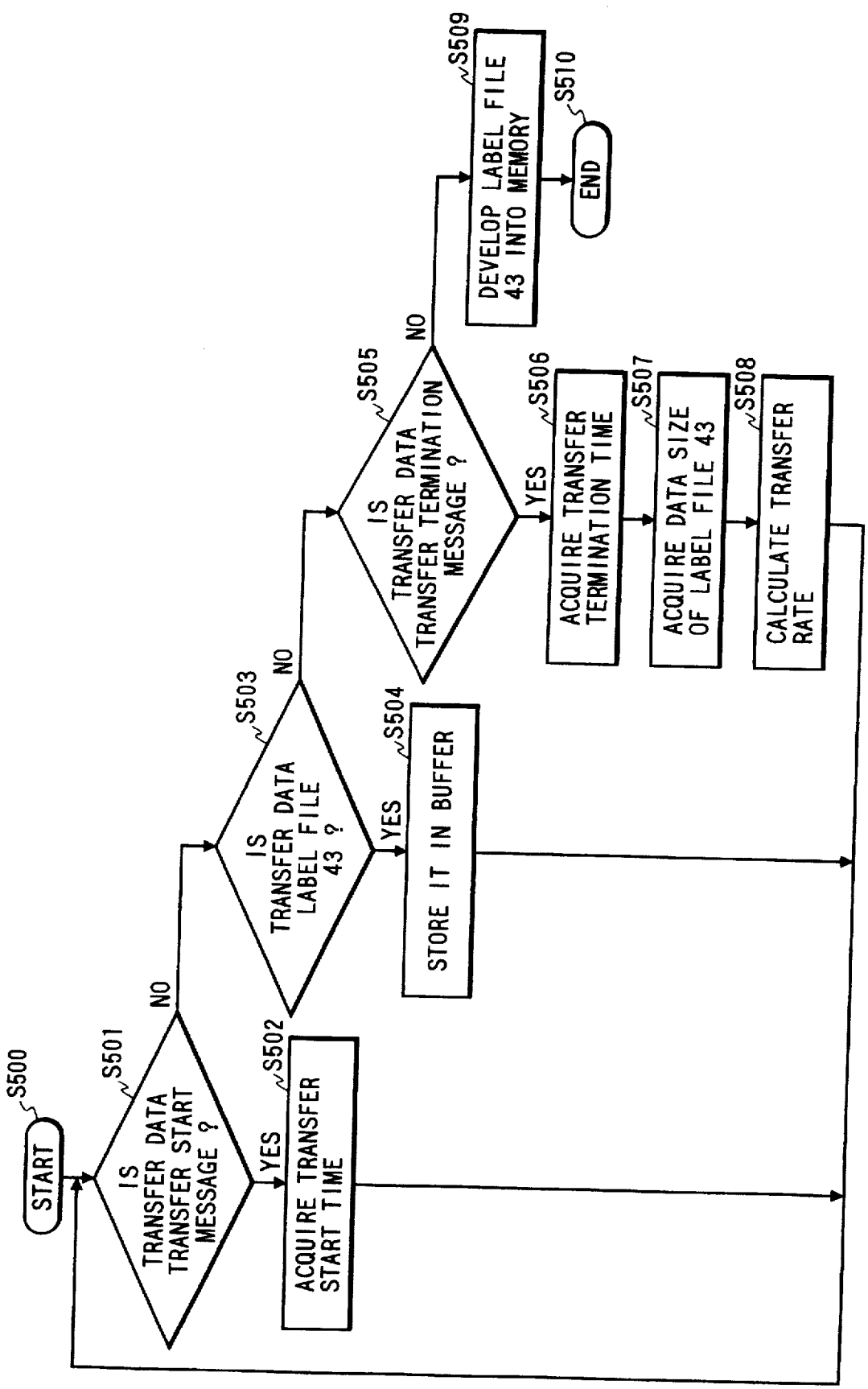
FIG. 11 is a flowchart showing the operation of means for measuring a data transfer rate according to the second embodiment of the invention.
Figure 12:
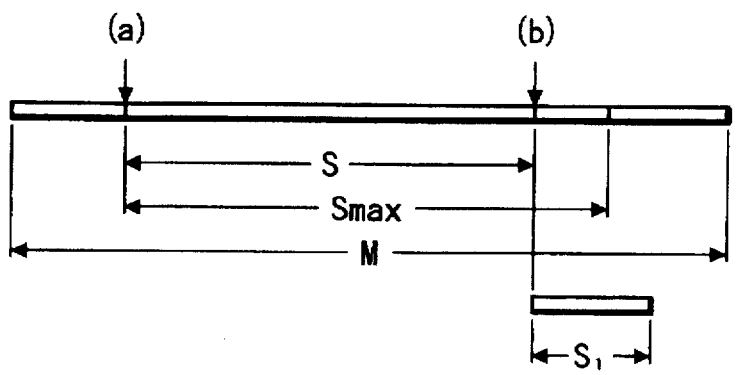
FIG. 12 is a block diagram of acquisition data in a storage area for temporarily storing acquisition data from PLC according to the second embodiment of the invention.

FIG. 10 is a functional diagram illustrating the function of the data processing apparatus; FIG. 11 a flowchart showing the operation of means 22f for measuring a data transfer rate as will be described later; FIG. 12 a block diagram of acquisition data in the storage area 22b for temporarily storing acquisition data from the PLC; and FIG. 13 a flowchart showing the operation of storing acquisition data in the means 22d for storing/transferring data. In these drawings, like reference characters designate corresponding components and reference numeral 22f denotes means for measuring a data transfer rate such as a program in the memory 22 of the subcontroller 20.

Referring to FIGS. 10 and 11, the operation of the means for measuring a data transfer rate. When the system is started first, the means 12b for retrieving/transferring set data of the main controller 10 reads the label file 43 in the text format from the data storage area 13a for setting acquisition conditions and acquisition data in the auxiliary storage unit 13 and while holding the label file 43 in the text format between transfer start and termination messages, transfers the label file 43 in the text format to the means 22f for measuring a data transfer rate.

Then, the means 22f for measuring a data transfer rate operates in accordance with the flowchart of FIG. 11. When the means 22f for measuring a data transfer rate is started at STEP S500 first, it is made to wait for transfer data in the standby state from the means 12b for retrieving/transferring set data of the main controller 10. At STEP S501, the transfer data is checked to see whether it is the transfer start message. If the transfer data is the transfer start message, transfer start time is obtained and the flow returns to STEP S501. If the transfer data is not the transfer start message, the transfer data is checked to see whether it is the label file 43 in the text format at STEP S503. If it is the label file 43 in the text format, the data is stored in the buffer area (not shown) of the memory 22 at STEP S505 and the flow returns to STEP S501. If the transfer data is not the label file 43 in the text format, further, the transfer data is checked to see whether it is the transfer termination message at STEP S505.

When the transfer data is the transfer termination message in this case, transfer termination time is obtained at STEP S506. At STEP S507, the data size of the label file 43 in the text format transferred during a period from start to termination of transfer is obtained. At STEP S508, a transfer rate is computed from the data size and the transfer time and the flow returns to STEP S501. In a case where the transfer data is not transfer termination message but a data acquisition start instruction such as a label name, the means 22c for developing/starting set information is used to develop the label file 43 in the form of the developed data 44 on the data developing area 22a for setting acquisition conditions and acquisition data. At STEP S510 then, the means 22d for storing/transferring data is started and the operation is terminated.

A description will subsequently be given of a method of computing the size of the storage area for storing data according to the data obtained by the means 22f for measuring a data transfer rate. Assuming that the data transfer rate computed by the means 22f for measuring a data transfer rate is V (byte/sec), the required size of the storage area 22b for temporarily storing acquisition data from the PLC in the memory 22 of the subcontroller 20 is the sum of the size S (byte) of data stored in the storage area 22b for temporarily storing acquisition data from the PLC and an additional area for storing data on PLC acquired during the time the data is transferred. Given that the number of label names is N and that the trigger supervisory interval defined in a label n ($1 \leq n \leq N$) is $T_n$ (sec), the trigger condition of the label n is satisfied $(S/V)/T_n$ times at the maximum in S/v (sec). Assuming that the acquisition data size obtainable from the information of the acquisition data defined in the label n is $D_n$ (bytes), for example, 6 (bytes) (derived from the sum of 2 (bytes) of the acquisition data 1 and 4 (bytes) of the acquisition data 2), the size required to store the acquisition data $D_n$ (bytes) of the label n becomes $S \cdot D_n/(V \cdot T_n)$ (bytes) at the maximum. Therefore, the size M (bytes) of the storage area 22b for temporarily storing acquisition data from the PLC required for N label names is computed from Eq. (1) below:

$$M = S + \frac{S}{V} \cdot \sum_{n=1}^{N} \frac{D_n}{T_n} \tag{1}$$

Consequently, the means 22d for storing/transferring data obtains the trigger supervisory interval $T_n$ and the acquisition data size $D_n$ from the data 44 developed in the data developing area 22a for setting acquisition conditions and acquisition data and also obtains the size S of the data stored in the storage area 22b for temporarily storing acquisition data from the PLC therefrom. The means 22d for storing/transferring data further obtains the data transfer rate V from the means 22f for measuring a data transfer rate to compute the required size M using Eq. (1) above and secures the size M required for the storage area 22b for temporarily storing acquisition data from the PLC in the memory 22.

Figure 13:
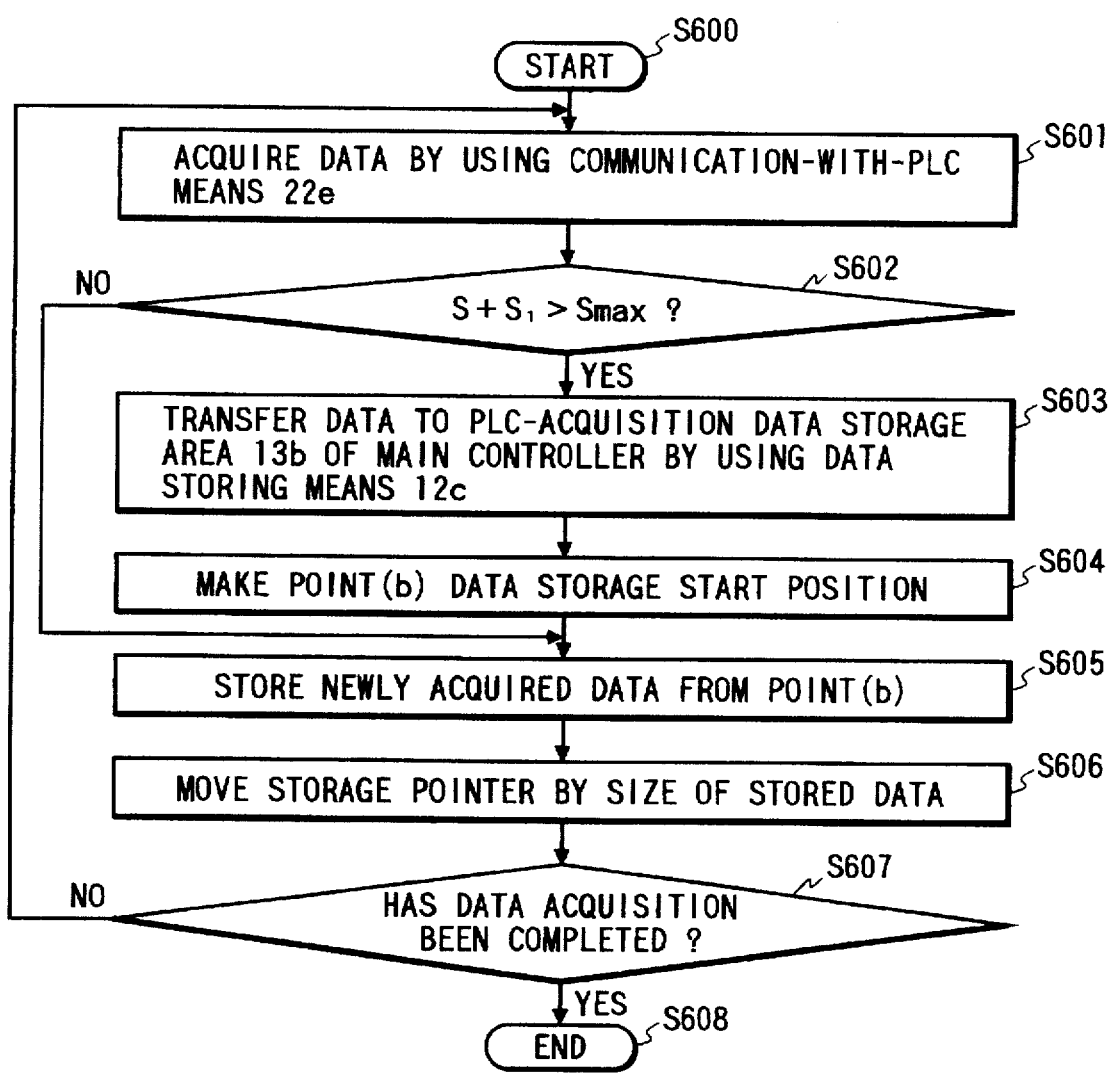
FIG. 13 is a flowchart showing the operation of storing acquisition data in the means for storing/transferring data according to the second embodiment of the invention.

Referring to FIGS. 12 and 13, a description will be given of the operation of storing acquisition data performed by the means 22d for storing/transferring data. In FIG. 12, a point (a) represents the position where data storage is commenced, and a point (b) the position where the present storage pointer is located. In other words, data which is M in size is stored between the points (a) and (b). Consequently, the whole storage area has a data size of M thus secured through the aforementioned method. $S_{max}$ representing the maximum value of the area used for storing data.

In the flowchart shown in FIG. 13, the means 22d for storing/transferring data is started at STEP S600. Then the means 22d for storing/transferring data acquires data from the memory 32 of the PLC 30 using the communication means 22e with the PLC, and stores data of size S1 newly acquired from the point (b) in addition to the data of size S that has been stored as shown in FIG. 12. At STEP S602, it is checked whether the sum of the data sizes S and S1 exceeds $S_{max}$. If the sum of the sizes does not exceed $S_{max}$, the flow bypasses the intermediate steps and goes to STEP S605 and stores the data newly acquired from the point (b) of FIG. 12. If the sum of the sizes exceeds the $S_{max}$, the means 12c for storing data on the main controller 10 is used STEP S603 to transfer the data to the storage area 13b for storing acquisition data from the PLC within the auxiliary storage unit 13. At STEP S604, the pointer is moved to indicate the point (b) of FIG. 12 as a data storage start position. At STEP S605, the data newly acquired is stored from the point (b) of FIG. 12. Subsequently at STEP S606, the pointer is moved to the extent of the size of the data newly acquired. Then at STEP S607, whether a termination instruction has been sent from the means 22c for developing/starting set information is checked. If the termination instruction has not been received, data acquisition is kept on. If the termination instruction has been received, data acquisition is finished at STEP S608.

As noted previously, the transfer start and termination messages are respectively added to the front and rear of the label file 43 in the text format transferred from the means 12b for retrieving/transferring set data of the main controller 10 to the subcontroller 20 before the label file 43 in the text format is transferred to the means 22f for measuring the data transfer rate. The means 22f for measuring the data transfer rate computes the data transfer rate V from these data, and the means 22d for storing/transferring data uses the data transfer rate V, the trigger supervisory interval $T_n$, the acquisition data size $D_n$ and the data size S obtained from the storage area 22b for temporarily storing acquisition data from the PLC to compute the size M necessary for the storage area 22b for temporarily storing acquisition data from the PLC from Eq. (1) so as to secure the area in the memory 22. Consequently, an area necessary and sufficient for the storage area 22b for temporarily storing acquisition data from the PLC can be secured without losing data from the PLC 30 acquired while the data stored in the storage area 22b for temporarily storing acquisition data from the PLC of the subcontroller 20 is being transferred to the storage area 13b for storing acquisition data from the PLC of the main controller 10.

Embodiment 3

Referring to FIGS. 5, 9, 14 and 15, a description will be given of a further data processing apparatus embodying the present invention, wherein a memory area supervisory interval is optimized in accordance with the interval at which the trigger condition for data acquisition is satisfied in order to improve the system efficiency. Japanese Patent Laid-Open Publication No. 205074/1993 discloses a data acquisition method in an information processing system in which data are acquired from equipment to be supervised at predetermined data acquisition intervals via a communication controller, and variations in the state of data during a predetermined measuring time are computed by means of a measuring timer so as to compare the measured result with the value obtained by dividing the predetermined measuring time by the data acquisition interval. By increasing or decreasing the predetermined period of time from the data acquisition interval according to the result obtained, the number of variations in that state is made equal to the value resulting from dividing the given measuring time by the data acquisition interval. However, a drawback pertaining to the method above is that it is not possible to revise the data acquisition interval properly by computing the deviation of the data acquisition interval in order to correct the interval to a greater or smaller degree depending on the amount of deviation thereof.

Figure 14:
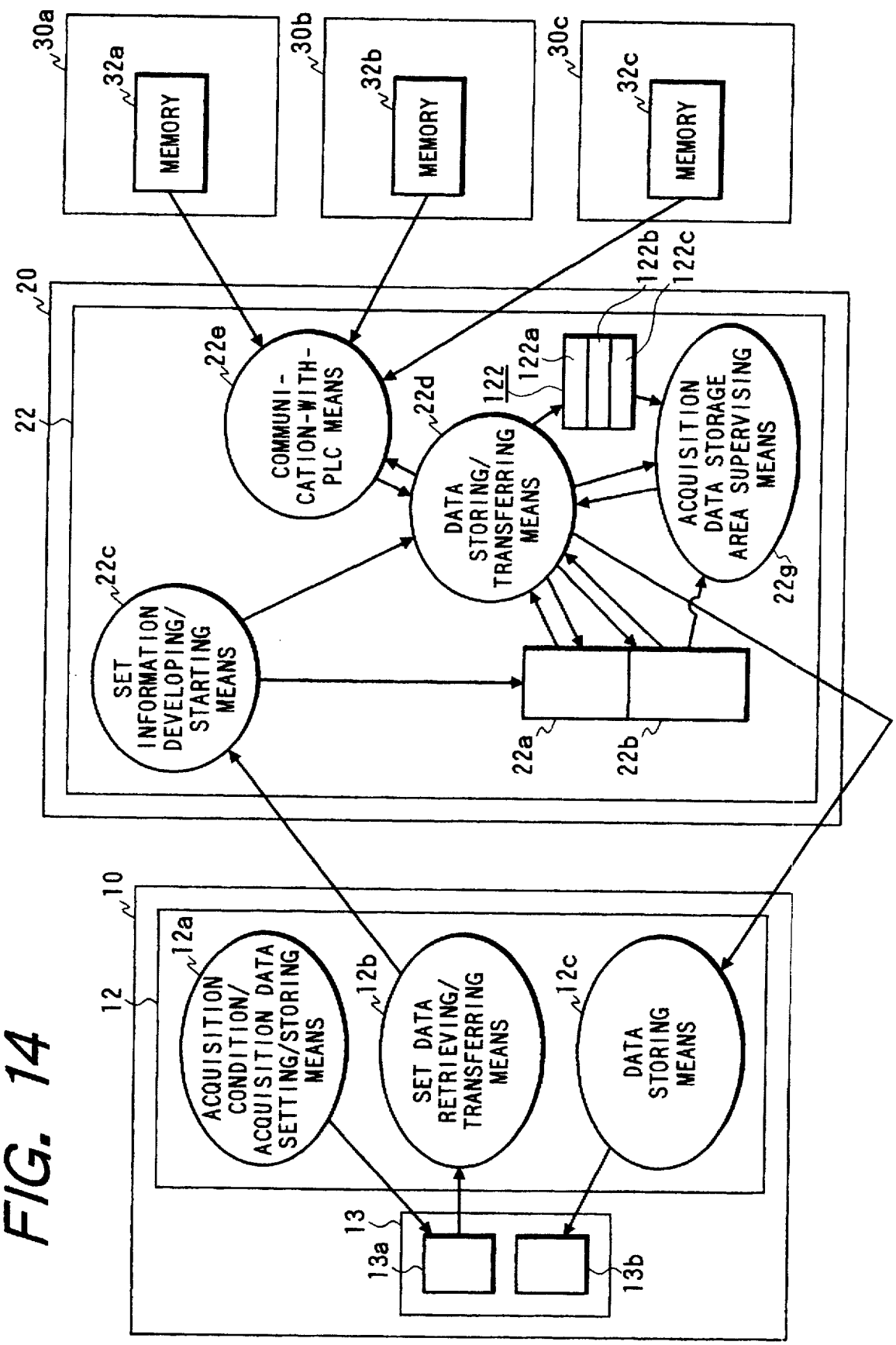
FIG. 14 is a functional diagram illustrating the function of a data processing apparatus according to the third embodiment of the invention.

FIG. 14 is a functional diagram illustrating the function of the data processing apparatus, and FIG. 15 a flowchart showing the operation of means 22g for supervising the acquisition data storage area (which will be described later), wherein like reference characters and numerals designate like or corresponding components. In FIG. 14, reference numeral 22g denotes means for supervising the acquisition data storage area, this means also functioning as means for supervising a program for supervising the storage area 22b for temporarily storing acquisition data from the PLC and means for computing supervisory interval; 122, an area for storing trigger condition satisfaction time; 122a, an area for storing initial trigger condition satisfaction time within the supervisory interval this time; 122b, an area for storing second trigger condition satisfaction time within the supervisory interval; and 122c, an area for storing final trigger condition satisfaction time within the supervisory interval, wherein year, month, day, hour, minute, second and millisecond values have been stored in a binary form. Although only three areas are shown as storage areas in FIG. 14, there may actually be provided areas capable of storing the time points corresponding to (m+1) triggers for which the condition is satisfied during the supervisory interval.

The operation in this embodiment will subsequently be described. The means 22c for developing/starting set information of the subcontroller 20 obtains the label file 43 in the text format from the means 12b for retrieving/transferring set data and develops the label file 43 in the form of developed data 44 on the data developing area 22a for setting acquisition conditions and acquisition data. Then, the means 22d for storing/transferring data refers to the developed data 44 and compares the developed data 44 with data in the memory 32 of the PLC 30 that the communication means 22e with the PLC has acquired so as to check whether the trigger condition is satisfied. When the trigger condition is satisfied, the time at which the trigger condition is satisfied is stored sequentially in the area 122 for storing trigger condition satisfaction time.

Figure 15:
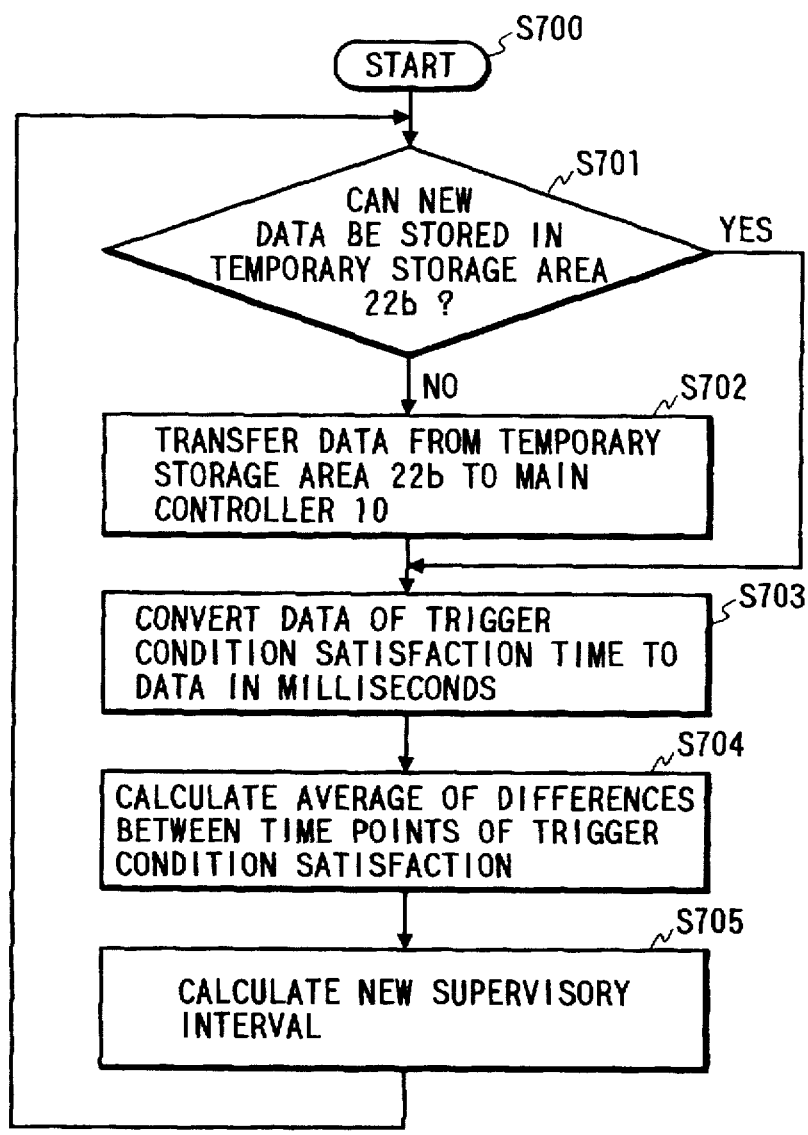
FIG. 15 is a flowchart showing the operation of means for supervising acquisition data storage area according to the third embodiment of the invention.

Then, the means 22g for supervising the acquisition data storage area is started at STEP S700 in the flowchart of FIG. 15 and selectively operated at given time intervals, for example, initially at a minimum supervisory interval of 100 ms. Subsequently at STEP S701, data of a maximum size from among acquisition data from the memory 32 of the PLC 30, the data being stored in the buffer area (not shown) provided in the memory 22, is checked to see whether the data thereof may be stored in the remaining area of the storage area 22b for temporarily storing acquisition data from the PLC within the memory 22. If the data is storable in the storage area 22b for temporarily storing acquisition data from the PLC, the flow bypasses S702 and goes to STEP S703. If it is not storable therein, the means 22d for storing/transferring data is used to transfer the acquisition data stored in the storage area 22b for temporarily storing acquisition data from the PLC to the main controller 10. At STEP S703, the entirety of the data stored in the area 122 for storing trigger condition satisfaction time is converted to data in milliseconds. Subsequently at STEP S704, based on the converted trigger condition satisfaction time data, differences between time points when the trigger condition is satisfied are calculated; more specifically, there are calculated $t_1$=(second trigger condition satisfaction time) −(first trigger satisfaction time), $t_2$=(third trigger condition satisfaction time)−(second trigger condition satisfaction time), . . . , $t_m$=((m+1)th trigger condition satisfaction time)−(m-th trigger condition satisfaction time). Then, an average of those differences is calculated such that $(t_1+t_2+ \ldots +t_m)/t_m$. At STEP S705, the next new supervisory interval is obtained from Eq. (2) or (3), which will be described later. The flow then returns to STEP S701 and the operation above is repeated at the new supervisory intervals.

Assuming that the present supervisory interval is regarded as the average of labels with which data acquisition is being carried out now, the new supervisory interval is obtainable in consideration of differences in trigger condition satisfaction time as follows:

(i) when at least one trigger condition is satisfied in the present supervisory interval (p), $$p_p = \left\{ \frac{\sum_{i=1}^{m} t_i}{m} + p(n-1) \right\} / n \quad (2)$$

(ii) when no trigger condition is satisfied in the current supervisory interval (p), in which case the supervising is continued until a trigger condition is first satisfied and the time point of the trigger condition satisfaction is represented by $t_1$, $$p_p = \{t_1 + p(n-1)\}/n \quad (3)$$

In the above equations, $t_i$ is a difference between (i+1)th satisfaction time and i-th satisfaction time, p is the present supervisory interval, n is the number of labels for which data acquisition is presently carried out, m is the number of condition-satisfied triggers in the supervisory interval, and $p_p$ is the new supervisory interval.

As set forth above, the optimum supervisory interval $p_p$ is obtained by means of Eq. (1) or (3) and this supervisory interval $p_p$ is used to supervise the storage area 22b for temporarily storing acquisition data from the a PLC, whereby when the trigger condition satisfaction interval is short, the memory area is frequently checked, while when it is long, checking frequency is reduced by increasing the supervisory interval. Consequently, the means 22g for supervising acquisition data storage area is prevented from excessively checking the storage area 22b for temporarily storing acquisition data from the PLC and the burden of the means 22g for supervising acquisition data storage area is minimized. The efficiency of the whole system can thus be improved.

Embodiment 4

Figure 16:
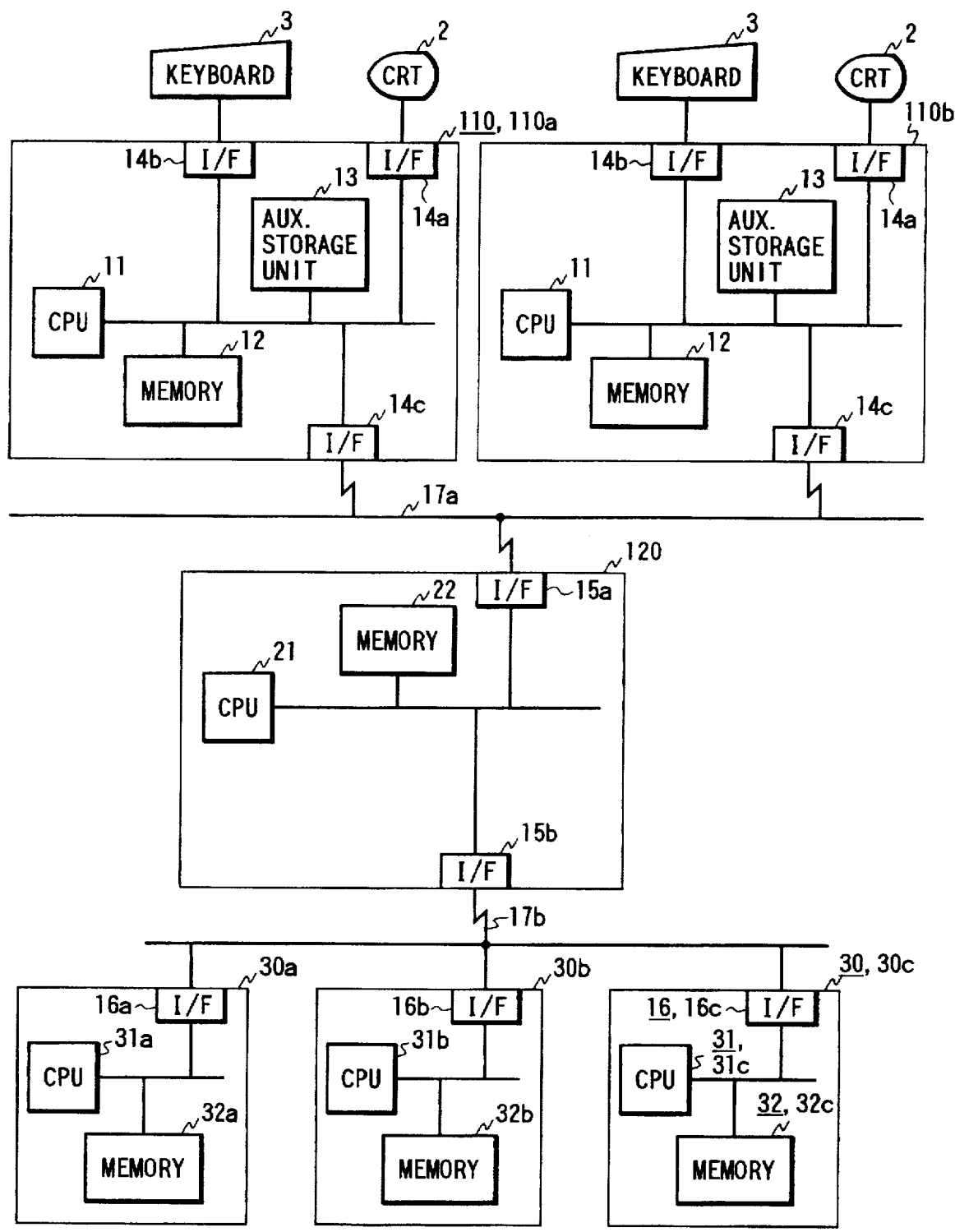
FIG. 16 is a schematic block diagram illustrating the system configuration of a data processing apparatus according to the fourth embodiment of the invention.
Figure 17:
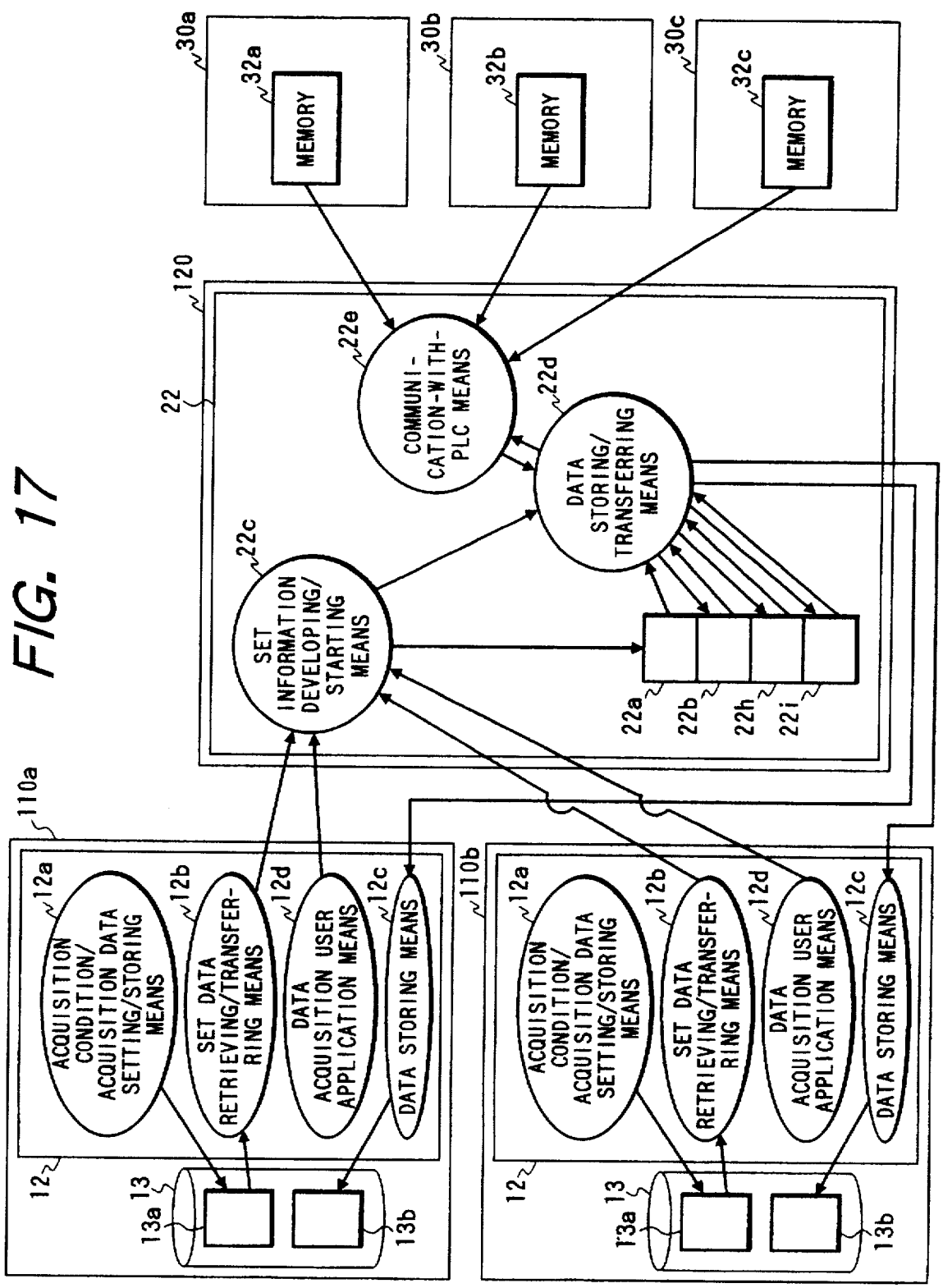
FIG. 17 is a functional diagram illustrating the function of the data processing apparatus according to the fourth embodiment of the invention.
Figure 20:
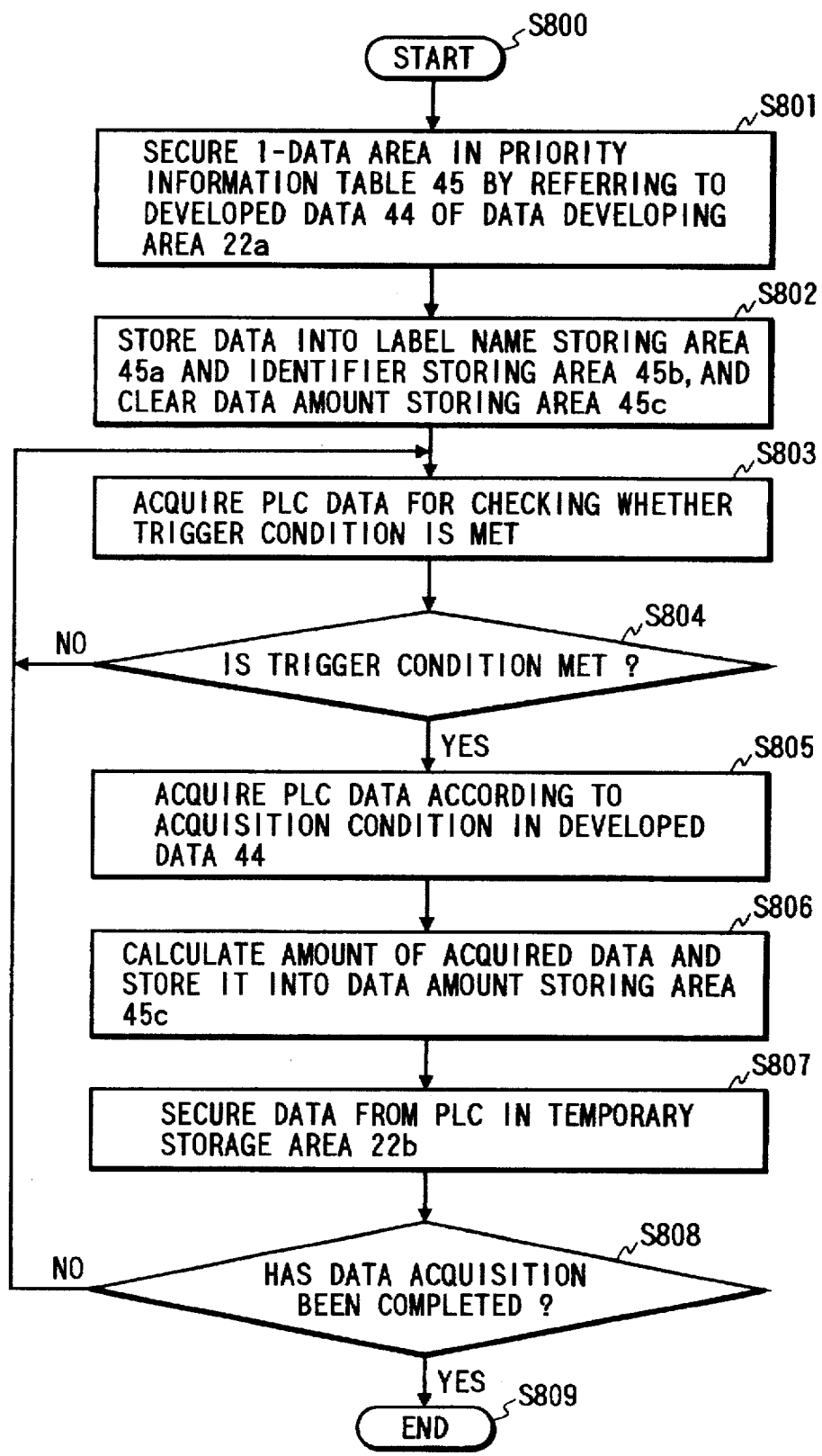
FIG. 20 is a flowchart showing the operation of starting and terminating data acquisition performed by means for storing/transferring data according to the fourth embodiment of the invention.

Referring to FIGS. 9 and 16 through 21 inclusive, a description will be given of still another data processing apparatus embodying the present invention, wherein when acquisition data is transferred from one storage unit to another, the data is transferred in a manner which minimizes the storage capacity of the storage unit holding the transfer data. FIG. 16 is a schematic block diagram illustrating the system configuration of the data processing apparatus; FIG. 17 a functional diagram illustrating the function of the data processing apparatus; FIG. 18 a block diagram showing the contents of a priority information table; FIG. 19 a block diagram showing the contents of a request source table; FIG. 20 a flowchart showing the operation of starting and terminating data acquisition performed by means 22d for storing/transferring data; and FIG. 21 a flowchart showing the operation of obtaining acquisition data performed by the means 22d for storing/transferring data.

In the drawings above, like reference characters and numerals designate like or corresponding components in FIGS. 1 and 2 of Embodiment 1, wherein reference numerals 110, 110a, 110b denote a plurality of main controllers; 120, a subcontroller; 12d, data acquisition user application means also functioning as request source information transfer means such as a user application program for data acquisition; 22h, an area for storing data is in a priority information table 45 as will be described later; 22i, an area for storing data in a request source table 46 as will be described later; 45, a priority information table; 45a, an area for storing label names; 45b, an area for storing the identifier of the main controller requesting data acquisition; 45c, an area for storing the amount of the acquisition data stored in the storage area 22b for temporarily storing acquisition data from the PLC of the subcontroller 120; 46, a request source table; and 46a, an area for storing the identifier of the main controller 110 requesting data acquisition.

The operation will subsequently be described. A request procedure from the operator generally follows the steps of first requesting the start of data acquisition, requesting the possession of acquisition data, and then requesting the termination of data acquisition. Referring now to the flowchart of FIG. 20, the operation of starting and terminating of data acquisition performed by the means 22d for storing/transferring data will be described first. At STEP S800, the data acquisition user application means 12d of the main controller 110 transfers a label name for data acquisition to the means 22c for developing/starting set information of the subcontroller 120. The means 22d for storing/transferring data started by the means 22c for developing/starting set information receives, as factors, the identifier of the main controller 110 requesting the start and termination of data acquisition; in the case of the main controller 110a, for example, "A" indicating the areas 45b, 46a for storing the identifiers of FIGS. 18 and 19, and a label name, for example, the area 45a for storing the label name "TOSOS-AGYOU" of FIG. 18.

Subsequently at STEP S801, the means 22d for storing/transferring data refers to the contents of the developed data 44 stored in the data developing area 22a for setting acquisition conditions and acquisition data as shown in FIG. 9 and secures an area for one data, that is, one line in the priority information table 45 and further adds the area to the rear of the data that has already been stored. At STEP S802, the label name received as a factor is stored in the area 45a for storing the label name in the priority information table 45 and the identifier of the main controller 110 received as a factor is stored in the area 45b for storing the identifier and further the area 45c for storing the amount of acquisition data is cleared. Subsequently at STEP S803, the communication means 22e with PLC is used to acquire data in the memory 22 of the PLC 30 to check the trigger condition. Then at STEP S804, it is checked whether the trigger condition is satisfied. If the trigger condition is not satisfied, the flow returns to STEP S803. If the trigger condition is satisfied, the communication means 22e with PLC is used in accordance with the conditions of acquisition in the developed data 44 to acquire the data in the memory 32 of the PLC 30. At STEP S806, the amount of the acquired data stored for each label is stored in the area 45c for storing the amount of acquired data.

Subsequently at STEP S807, the data acquired from the PLC is stored in the storage area 22b for temporarily storing acquisition data from the PLC. At STEP S808 further, it is checked whether the termination instruction has been received from the means 22c for developing/starting set information. If the termination instruction has not been received, the flow returns to STEP S803. If the termination instruction has been received, the operation is terminated at STEP S809.

Figure 21:
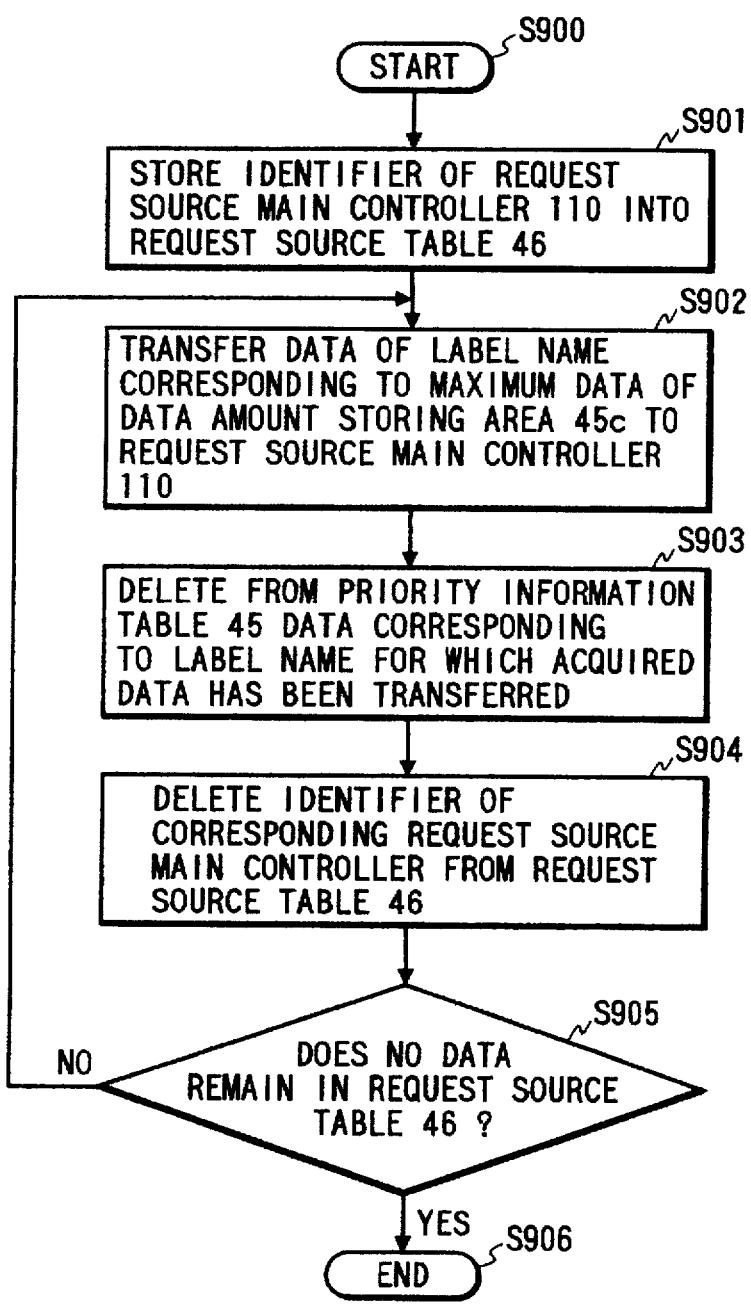
FIG. 21 is a flowchart showing the operation of obtaining acquisition data performed by the means for storing/transferring data according to the fourth embodiment of the invention.
Figure 22:
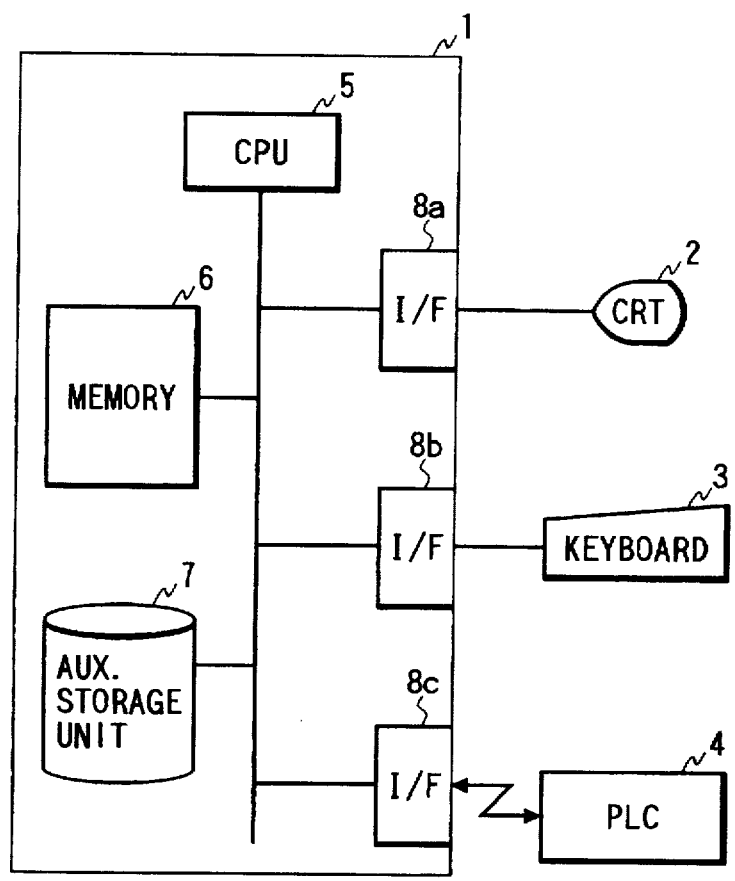
FIG. 22 is a block diagram illustrating the constitution of a conventional data processing apparatus.
Figure 23:
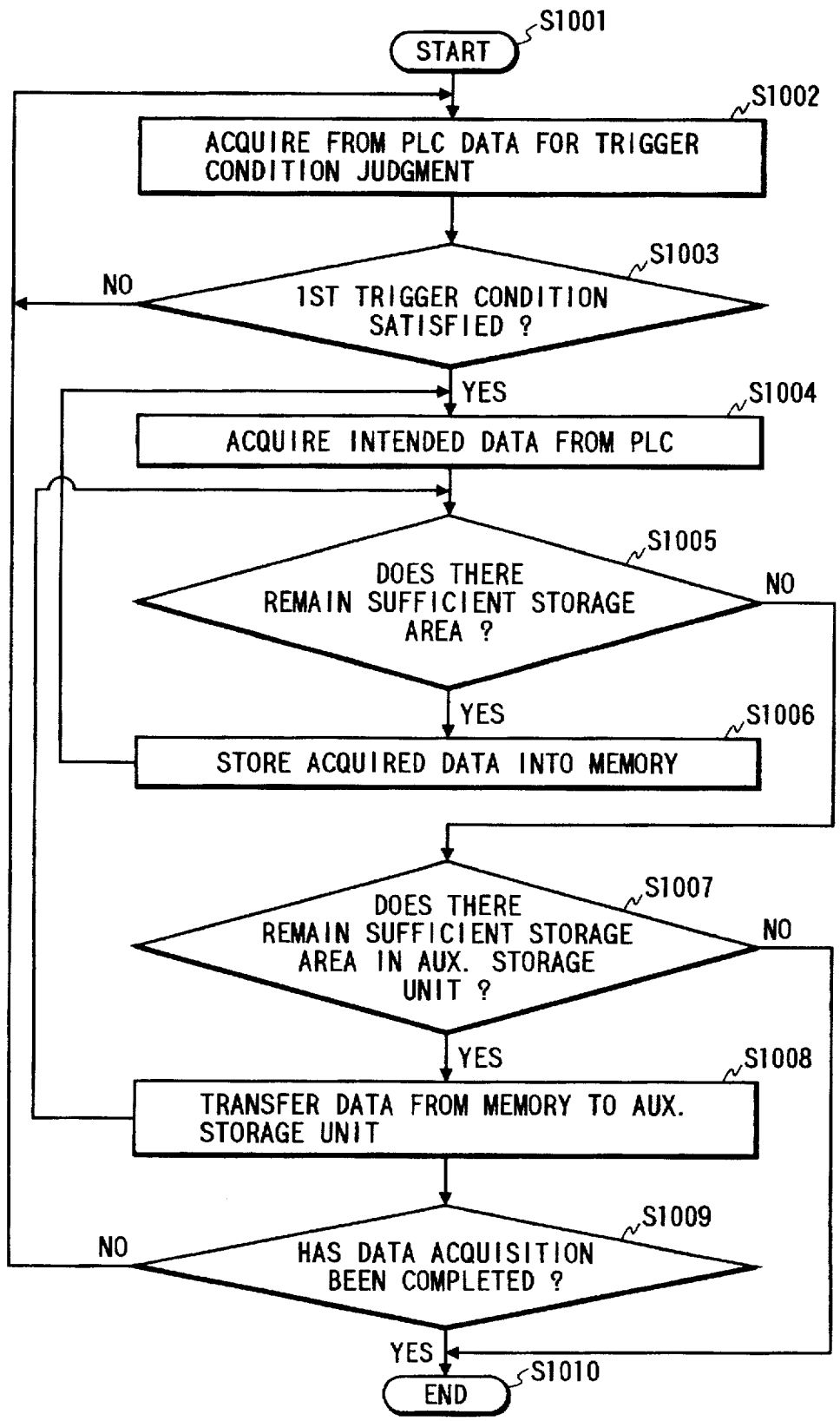
FIG. 23 is a flowchart showing a conventional data processing method.

Referring to a flowchart of FIG. 21, the process of obtaining acquisition data by the means 22d for storing/transferring data will be described. At STEP S900 first, the data acquisition user application means 12d of the main controller 110 transfers a request for data acquisition to the means 22c for developing/starting set information. The means 22d for storing/transferring data started by the means 22c for developing/starting set information receives the identifier of the main controller 110 requesting data acquisition as a factor; in the case of the main controller 110a, for example, "A" indicating the areas 45b and 46a for storing the identifiers of FIGS. 18 and 19.

At STEP S901, the means 22d for storing/transferring data stores the identifier of the main controller 110 received as a factor in the area 46a for storing identifiers in the request source table 46. When requests for data acquisition are simultaneously made by a plurality of main controllers 110 then, the identifiers of all the main controllers 110 are stored in the area 46a for storing identifiers. Subsequently at STEP S902, priority order is given to only the data of the request source main controllers 110 in a case where the same identifiers as those of the request source main controllers 110 stored in the area 45b for storing identifiers in the priority information table 45 are stored in the area 46a for storing identifiers in the request source table 46. The priority order is determined in the order of large-to-small capacity of the acquisition data stored in the area 45c for storing the capacity of acquisition data in the priority information table 45. First, the acquisition data stored in the storage area 22b for temporarily storing acquisition data from storage area 22b for temporarily storing acquisition data from the PLC having a label name corresponding to acquisition data having the largest capacity is transferred via the means 12c for storing data of the main controller 110 to the storage area 13b for storing acquisition data from the PLC in the auxiliary storage unit 13.

Subsequently at STEP S903, data corresponding to the label name with the acquisition data transferred from the priority information table 45 is deleted, and at STEP S904, the identifier of the corresponding request source main controller 110 is deleted from the area 46a for storing identifiers in the request source table 46. At STEP S905 further, the area 46a for storing identifiers in the request source table 46 is checked to see whether the whole of the data is deleted. If some data are left therein, the flow returns to STEP S902 and the process of transferring acquisition data is repeated. If all of the data has been deleted, the process of data acquisition is terminated at STEP S906.

As set forth above, priority is given to acquisition data having a larger capacity when such data is transferred to the main controller 110. Consequently, the area of the memory 22 of the subcontroller 120 for use in storing and transferring acquisition data can be utilized with efficiency.

As the present invention is constituted as described above, the following effect is achievable.

There is provided a data processing method including a main controller and a subcontroller, wherein the main controller forms, in the form of a text format, a data acquisition condition for a particular subject device from which data is to be acquired so that the data acquisition condition is associated with a label name. The data acquisition condition includes a supervisory interval for supervising statuses of the particular subject device and a plurality of subject devices related thereto as well as the operation statuses of the particular subject device and the plurality of subject devices for setting a trigger condition for starting data acquisition. The subcontroller develops and stores, when receiving the label name and the corresponding data acquisition condition from the main controller, the received data acquisition condition in a memory so that the data acquisition condition is associated with the label name. The subcontroller compares, when receiving only the label name from the main controller, the data acquisition condition that is developed and stored in the memory with data of the particular subject device and the plurality of subject devices, acquires data from the particular subject device when the data acquisition condition is satisfied, and transfers the acquired data to the main controller. Therefore, in accordance with the contents of the data received from the main controller, the subcontroller develops and stores the data acquisition conditions in the memory, or acquires data while referring to the data acquisition conditions stored in the memory and transfers the acquired data to the main controller. Thus, in acquiring data, since the only action required is the assignment of a label name, the system operation rate is significantly improved.

The main controller is of a type that allows data input and setting in an interactive manner. The main controller sets a label name, the supervisory interval of the subject devices that are included in the label name, the number of trigger conditions for starting data acquisition, and the number of particular subject devices from which data is to be acquired in a first display picture, sets, as trigger conditions, the subject devices included in the label name which correspond to the number of trigger conditions and operation conditions of the subject devices in a second display picture that follows the first display picture, and sets acquired data sizes of the particular subject devices from which data is to be acquired in a third display picture that follows the second display picture. Therefore, data are input and set in accordance with instructions appearing on the display screen in the order of the setting conditions for the respective label names, the setting conditions for the respective trigger conditions, and the setting conditions for the respective acquisition data. Thus, the kinds of data to be set in the three display pictures can be allocated so as to correspond to the respective display pictures, thereby reducing the possibility of erroneous input and setting of data.

The main controller adds a transfer start message to a transfer start portion of the data acquisition condition in the text format which corresponds to the label name, and adds a transfer termination message to a transfer termination portion. The subcontroller calculates the data transfer rate based on the transfer time from reception of the transfer start message to reception of the transfer termination message and the size of data that is contained between the transfer start message and the transfer termination message, and calculates a storage area necessary to store data that is newly acquired by the subcontroller while the subcontroller transfers the acquired data to the main controller based on the data transfer rate and the data size of the data acquisition condition that is developed and stored in the memory. Therefore, data newly acquired during transfer of the already acquired data can be stored without losing the former. Thus, a necessary and sufficient storage area can be secured.

The storage area necessary to store data that is newly acquired by the subcontroller while the subcontroller transfers the acquired data to the main controller is calculated by summing the acquisition data sizes of all the label names divided by the respective supervisory intervals for supervising the subject devices, multiplying the resulting sum value by the transfer time of data to the main controller, and adding the size of the data to be transferred to the main controller to a resulting product value. Therefore, the storage area is calculated as an area for the acquired data of all the label names that are acquired during the transfer time of the acquired data added with the data to be transferred. Thus, a necessary and sufficient storage area can be secured so as to be correlated with the data transfer time and size, the trigger supervisory interval, the acquisition data sizes of the respective labels, and the number of labels.

The subcontroller supervises, at the prescribed supervisory interval, the statuses of the particular subject device from which data is to be acquired and the plurality of subject devices related thereto, and determines a new supervisory interval by determining the number of occurrences in the prescribed supervisory interval of events that the trigger condition for starting data acquisition is satisfied and differences between time points of the occurrences, calculating an average of occurrence periods of trigger condition satisfaction by dividing the sum of the differences between the time points of the occurrences by the number of occurrences, multiplying the prescribed supervisory interval by the total number of label names minus one, adding the average of the occurrence periods to the resulting product value, and dividing the resulting sum value by the total number of label names. Therefore, when the trigger condition is satisfied in the prescribed supervisory interval, the supervisory interval is always corrected using the average of the occurrence periods of trigger condition satisfaction. Thus, when the trigger condition is satisfied in the prescribed supervisory interval, the supervisory interval can be varied in accordance with the interval of satisfaction of the data acquisition condition, resulting in improved system efficiency.

When the trigger condition for starting data acquisition is not satisfied in a prescribed supervisory interval for supervising the statuses of the subject devices, a new supervisory interval is determined by measuring a period until the trigger condition is first satisfied, multiplying the prescribed supervisory interval by a total number of label names minus one, and adding the period until the trigger condition is first satisfied to a resulting product value, and dividing a resulting sum value by the total number of label names. Therefore, when the trigger condition is not satisfied in the prescribed supervisory interval, the supervisory interval is corrected by using the period in which the trigger condition is first satisfied. Thus, even when the trigger condition for starting data acquisition is not satisfied in the prescribed supervisory interval, the supervisory interval can be varied in accordance with the interval of satisfaction of the data acquisition condition, resulting in improved system efficiency.

The subcontroller temporarily stores in a memory the data acquired from the particular subject device in accordance with the label name, and transfers the acquired data corresponding to a plurality of label names to the main controller in accordance with amounts of the acquired data. Therefore, the storage capacity necessary to store the acquired data can be minimized, and the storage areas of the subcontroller can be utilized efficiently.

There is provided another data processing method including a plurality of main controllers and a subcontroller, wherein each of the plurality of main controllers has an identifier to be used for discrimination from the other main controllers. The main controller determines, in the form of a text format, a data acquisition condition for a particular subject device from which data is to be acquired so that the data acquisition condition is associated with a label name, the data acquisition condition including a supervisory interval for supervising statuses of the particular subject device and a plurality of subject devices related thereto and operation statuses of the particular subject device and the plurality of subject devices for setting a trigger condition for starting data acquisition. The subcontroller develops and stores, when receiving the label name and the corresponding data acquisition condition from the main controller, the received data acquisition condition in a memory so that the data acquisition condition is associated with the label name, and compares, when receiving only the identifier and the label name from the main controller, the data acquisition condition that is developed and stored in the memory with data of the particular subject device and the plurality of subject devices, acquires data from the particular subject device when the data acquisition condition is satisfied, temporarily stores the acquired data in a memory so that the data is associated with the label name and the identifier, compares an identifier corresponding to the acquired data with identifiers of the plurality of main controllers that are requesting data transfer, and transfers the data corresponding to the label name having a coincidence-found identifier to the main controller having the coincidence-found identifier in accordance with an amount of the data. Therefore, the acquired data is transferred to the particular one of a plurality of main controllers, and the storage capacity necessary to store the acquired data can be minimized. Thus, the storage areas of the subcontroller can be utilized efficiently.

What is claimed is:

1. A data processing method performed with a main controller and a subcontroller, comprising:

the main controller determining, in the form of a text format, a data acquisition condition for a particular subject device from which data is to be acquired, whereby the data acquisition condition is associated with a label name, wherein the data acquisition condition includes a supervisory interval for supervising statuses of the particular subject device and of a plurality of subject devices related thereto and operation statuses of the particular subject device and the plurality of subject devices for setting a trigger condition for starting data acquisition; and the subcontroller, upon receiving the label name and the corresponding data acquisition condition from the main controller, developing and storing the received data acquisition condition in a memory so that the data acquisition condition is associated with the label name; and the subcontroller, upon receiving only the label name from the main controller, comparing a previously developed and stored data acquisition condition, developed and stored in the memory, with data from the particular subject device and the plurality of subject devices, and acquiring data from the particular subject device when the previously developed and stored data acquisition condition is satisfied; and the subcontroller transferring the acquired data to the main controller.

2. The data processing method as claimed in claim 1, wherein the main controller allows data input and setting in an interactive manner, and wherein the main controller sets the label name, the supervisory interval of the subject devices included in the label name, the number of trigger conditions for starting the data acquisition, and the number of particular subject devices from which data is to be acquired, in a first input display picture; the main controller further setting, as trigger conditions, the subject devices included in the label name which correspond to the number of trigger conditions and operation conditions of the subject devices in a second input display picture that follows the first input display picture; and the main controller gets acquired data sizes for the subject devices from which data is to be acquired, in a is third input display picture that follows the second input display picture.

3. The data processing method as claimed in claim 1, further comprising the main controller:

adding a transfer start message to a transfer start portion of the data acquisition condition in the text format corresponding to the label name; and adding a transfer termination message to a transfer termination portion of the data acquisition condition; and the subcontroller:

calculating a data transfer rate based on a transfer time measured from reception of the transfer start message to reception of the transfer termination message and an amount of data contained therebetween; and calculating a storage area necessary to store data newly acquired by the subcontroller while the subcontroller transfers the acquired data to the main controller based on the data transfer rate and the data size of the data acquisition condition developed and stored in the memory.

4. A data processing method as claimed in claim 3, wherein the storage area necessary to store the data newly acquired by the subcontroller while the subcontroller transfers the acquired data to the main controllers is calculated by summing the acquisition data sizes corresponding to all the label names divided by the respective supervisory intervals for supervising the subject devices, multiplying a resulting sum value by the transfer time of data transferred to the main controller, and adding a size of the data to be transferred to the main controller to a resulting product value.

5. The data processing method as claimed in claim 1, further comprising the subcontroller:

supervising, at the prescribed supervisory interval, statuses of the particular subject device from which data is to be acquired and the plurality of subject devices related thereto; and determining a new supervisory interval by determining the number of occurrences in the prescribed supervisory interval of events that satisfy the trigger condition for starting data acquisition and time differences between the occurrences;

calculating an average of trigger condition satisfaction occurrence periods by dividing a sum of the time differences between the occurrences by the number of occurrences, multiplying the prescribed supervisory interval by a total number of label names minus one, adding the average of the trigger condition satisfaction occurrence periods to a resulting product value, and dividing a resulting sum value by the total number of label names.

6. The data processing method as claimed in claim 1, further comprising: determining a new supervisory interval, when the trigger condition for starting data acquisition is not satisfied in a prescribed supervisory interval for supervising the statuses of the subject devices, by measuring a period until the trigger condition is first satisfied, multiplying the prescribed supervisory interval by a total number of label names minus one, and adding the period until the trigger condition is first satisfied to a resulting product value, and dividing a-resulting sum value by the total number of label names.

7. The data processing method as claimed in claim 1, further comprising the subcontroller:

temporarily storing in a memory the data acquired from the particular subject device in accordance with the label name; and transferring the acquired data corresponding to a plurality of label names to the main controller in accordance with amounts of the acquired data.

8. A data processing method performed in a system including a plurality of main controllers and a subcontroller, wherein each of the plurality of the main controllers has an identifier to be used for discrimination from the other main controllers, and forms, in the form of a text format, a data acquisition condition for a particular subject device from which data is to be acquired, whereby the data acquisition condition is associated with a label name, the data acquisition condition including a supervisory interval for supervising statuses of the particular subject device and a plurality of subject devices related thereto and operation statuses of the particular subject device and the plurality of subject devices, the method comprising:

is one of the plurality of main controllers setting a trigger condition for starting data acquisition; and the subcontroller, upon receiving the label name and the corresponding data acquisition condition from said one of the plurality of main controllers, developing and storing the received data acquisition condition in a memory so that the data acquisition condition is associated with the label name;

the subcontroller, upon receiving only the identifier and the label name from said one of the plurality of main controllers, comparing a data acquisition condition previously developed and stored in the memory with data of the particular subject device and the plurality of subject devices, and acquiring data from the particular subject device when the previously developed and stored data acquisition condition is satisfied;

the subcontroller temporarily storing the acquired data in a memory so that the acquired data is associated with the label name and the identifier;

the subcontroller comparing an identifier corresponding to the acquired data with identifiers of the plurality of main controllers requesting data transfer; and the subcontroller transferring the data corresponding to the label name having a coincidence-found identifier to the main controller having the coincidence-found identifier in accordance with an amount of the data.

* * * * *